(12) United States Patent
Chen et al.

(10) Patent No.: US 11,789,138 B2
(45) Date of Patent: Oct. 17, 2023

(54) METHODS AND APPARATUS TO IMPLEMENT COMPACT TIME-FREQUENCY DIVISION MULTIPLEXING FOR MIMO RADAR

(71) Applicant: Intel Corporation, Santa Clara, CA (US)

(72) Inventors: Chulong Chen, Santa Clara, CA (US); Saiveena Kesaraju, Hillsboro, OR (US); Moshe Teplitsky, Tel-Aviv (IL); Alon Cohen, Petach Tikva (IL)

(73) Assignee: INTEL CORPORATION, Santa Clara, CA (US)

( * ) Notice: Subject to any disclaimer, the term of this patent is extended or adjusted under 35 U.S.C. 154(b) by 753 days.

(21) Appl. No.: 16/455,239

(22) Filed: Jun. 27, 2019

(65) Prior Publication Data

US 2020/0233076 A1    Jul. 23, 2020

(51) Int. Cl.

| G01S 13/58 | (2006.01) |
| G01S 7/48 | (2006.01) |
| G01S 7/292 | (2006.01) |
| G01S 7/28 | (2006.01) |
| G01S 7/4865 | (2020.01) |
| H04B 7/0413 | (2017.01) |
| G01S 7/288 | (2006.01) |

(52) U.S. Cl.
CPC ............ G01S 13/584 (2013.01); G01S 7/288 (2013.01); G01S 7/292 (2013.01); G01S 7/4865 (2013.01); H04B 7/0413 (2013.01); *G01S 7/2883* (2021.05)

(58) Field of Classification Search
CPC ........ G01S 13/584; G01S 7/288; G01S 7/292; G01S 7/4865; G01S 7/2883; H04B 7/0413
See application file for complete search history.

(56) References Cited

U.S. PATENT DOCUMENTS

| 3,009,144 | A   | * | 11/1961 | Landee ................. G01S 13/913 315/378 |
| 9,048,988 | B2  | * | 6/2015  | Murakami .......... H04L 27/2613 375/295 |
| 2012/0146844 | A1 | * | 6/2012  | Stirling-Gallacher ...................... G01S 13/343 342/189 |
| 2018/0011170 | A1 | * | 1/2018  | Rao ......................... G01S 13/42 |
| 2019/0056478 | A1 | * | 2/2019  | Millar ...................... H04B 1/69 |
| 2020/0393553 | A1 | * | 12/2020 | Kishigami .............. G01S 7/036 |
| 2021/0156982 | A1 | * | 5/2021  | Stettiner ............... G01S 13/347 |

* cited by examiner

*Primary Examiner* — Timothy A Brainard
*Assistant Examiner* — Juliana Cross
(74) *Attorney, Agent, or Firm* — Hanley, Flight & Zimmerman, LLC

(57) ABSTRACT

Methods and apparatus to implement compact time-frequency division multiplexing for MIMO radar are disclosed. An apparatus includes an antenna array controller to: transmit a first signal via a first transmitter of a radar antenna array, the first signal having a first duration and modulated across a first frequency range; and transmit a second signal via a second transmitter, the second signal having a second duration and modulated across a second frequency range, the first and second durations including an overlapping period of time, the first and second frequency ranges including an overlapping frequency range. The apparatus further includes a signal separation analyzer to: determine a first echo received at a receiver of the radar antenna array corresponds to the first signal; and determine a second echo received at the receiver corresponds to the second signal.

32 Claims, 15 Drawing Sheets

METHODS AND APPARATUS TO IMPLEMENT COMPACT TIME-FREQUENCY DIVISION MULTIPLEXING FOR MIMO RADAR

FIELD OF THE DISCLOSURE

This disclosure relates generally to radar systems, and, more particularly, to methods and apparatus to implement compact time-frequency division multiplexing for MIMO radar.

BACKGROUND

Multiple-input multiple-output (MIMO) radar systems includes multiple transmitters that transmit radar signals that are subsequently detected by multiple receivers after being reflected by objects within range of the radar systems. The signals transmitted by the different transmitters in a MIMO radar system are designed to be mutually orthogonal so that, when the signals are detected by the receivers, the signals can be uniquely identified as corresponding to particular ones of the transmitters.

BRIEF DESCRIPTION OF THE DRAWINGS

In general, the same reference numbers will be used throughout the drawing(s) and accompanying written description to refer to the same or like parts.

Figure 1:
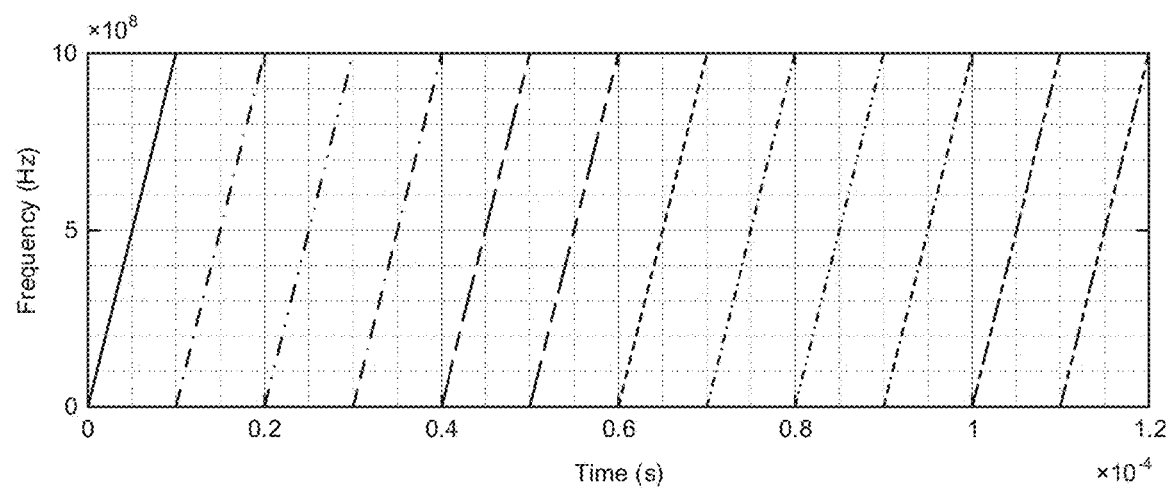
FIG. 1 is a graph illustrating a conventional time division multiplexing-linear frequency modulation (TDM-LFM) waveform corresponding to a single chirp cycle for a radar system with twelve transmitters.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

In a multiple-input multiple-output (MIMO) radar system, the transmissions from different transmit antennas (referred to herein as transmitters) are separable or distinguishable at receive antennas (referred to herein as receivers). The separability (e.g., distinguishability) of transmissions from different transmitters is typically achieved by making the different transmissions orthogonal to one another. Two signals are orthogonal when the correlation between them is equal to zero. Common approaches to achieve orthogonality in MIMO systems include time-division multiplexing (TDM), frequency-division multiplexing (FDM), and/or code division multiplexing (CDM).

In a conventional radar system based on linear frequency modulation (LFM) (which uses a frequency-modulated continuous-wave (FMCW)), to achieve fully orthogonal signals in the time-frequency domain, separate transmitters have to use non-overlapping time intervals and/or non-overlapping frequency bands. That is, in the TDM approach, different signals (though covering the same frequency range) are transmitted at different times such that each signal is temporally spaced from other signals with no overlap in the time domain. In the FDM approach, different signals (though transmitted at the same time) are transmitted within different frequency bands such that each signal does not overlap with any other signal within the frequency domain. While the conventional TDM and FDM schemes achieve orthogonality, such approaches result in an inefficient usage of time and/or frequency resources. Furthermore, such systems are relatively inflexible in tradeoffs between different radar key performance indicator (KPI) specifications and design parameters for a radar.

Traditional approaches to achieve orthogonality are impractical for MIMO systems because such systems often have many transmitters. For example, if a MIMO antenna array includes 12 different transmitters (and in some applications there may be more), the time each transmitter would have to transmit a signal (also referred to herein as a chirp) in a TDM implementation would be only $1/12^{th}$ of a chirp cycle. Providing adequate time for each individual chirp results in a relatively long chirp cycle, which translates into a longer pulse repetition interval (PRI) (the time extending from the beginning of one chirp cycle to the beginning of a subsequent chirp cycle) as demonstrated with reference to FIG. 1.

FIG. 1 is a graph illustrating a conventional TDM-linear frequency modulation (LFM) waveform corresponding to a single chirp cycle for a radar system with twelve transmitters. In the graph, each chirp corresponding to a different transmitter is represented by a differently stylized line. As shown in FIG. 1, each chirp has a duration of 10 microseconds, with each successive chirp (corresponding to different transmitters) beginning as the previous chirp ends. As a result, the total length of the chirp cycle last for 120 microseconds. A further delay beyond the end of the chirp cycle is included before a second chirp cycle is implemented, thereby resulting in a relatively long PRI.

The relatively long PRI in a TDM scheme results in a number of disadvantages including a relatively low maximum unambiguous velocity (e.g., the maximum velocity of a target that the radar can reliably measure), irreducible range migration, and the need to compensate for motion induced phase rotation (with the possibility of irreducible phase ambiguity if a target is moving fast enough). Furthermore, MIMO systems implemented using a conventional TDM scheme exhibit relatively low effective isotropic radiated power (EIRP) because only one transmitter is activated at a time. The low EIRP, in conjunction with the relatively long PRI, results in a relatively low link budget. The low EIRP can be somewhat alleviated by implementing slow-time phase coding modulation (PCM) to allow multiple transmitters to be active at the same time, but this does not solve the other disadvantages of the TDM approach. Further, phase coded modulation (PCM) introduces cross-talk between phase-codes, thereby increasing the noise floor and limiting the number of antennas that can be used, which limits the effective signal-to-noise ratio (SNR) of the radar system.

If a MIMO system including 12 different transmitters was implemented using the FDM approach, the frequency band for each transmitter would be limited to only $1/12^{th}$ of the full frequency bandwidth of the system. Therefore, providing an adequate frequency band for each transmitter in such a system requires a relatively large total frequency bandwidth as demonstrated in FIG. 2.

Figure 2:
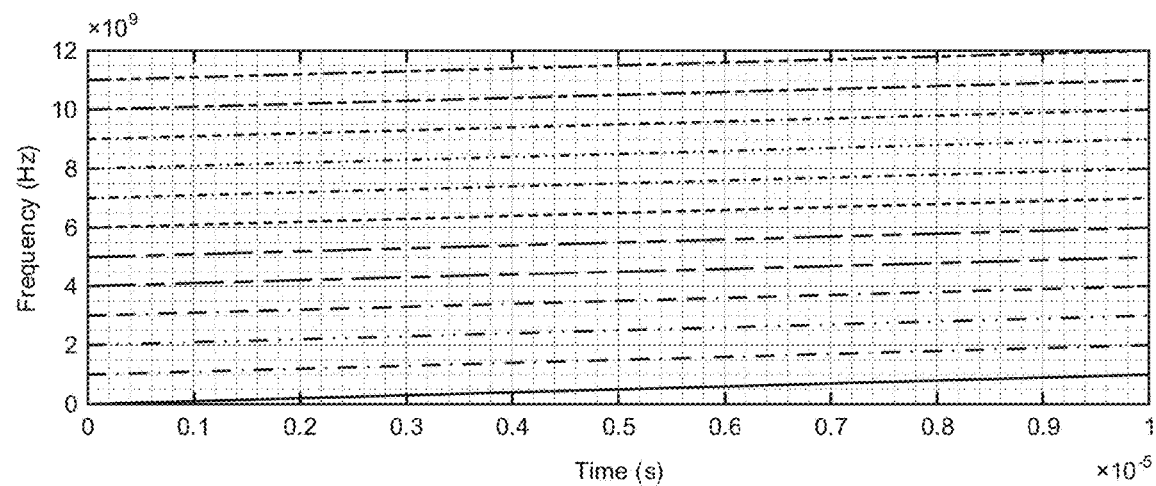
FIG. 2 is a graph illustrating a conventional frequency division multiplexing-linear frequency modulation (FDM-LFM) waveform corresponding to a single chirp cycle for a radar system with twelve transmitters.

FIG. 2 is a graph illustrating a conventional FDM-LFM waveform corresponding to a single chirp cycle for a radar system with twelve transmitters. As shown in FIG. 2, each chirp begins and ends at the same time such that the chirp cycle is the same duration as a single chirp (e.g., 10 microseconds). However, the different chirps are separated into different frequency bands each extending over a 1 GHz range, with the frequency bands being contiguous with one another (e.g., the initial frequency of each chirp begins at the final frequency of an adjacent chirp in the frequency domain). As a result, the total frequency bandwidth for the radar system is 12 GHz which is infeasible due to regulatory limits.

The relatively large frequency bandwidth used in the FDM approach for a MIMO system requires an unreasonably high analog-to-digital converter (ADC) sampling rate if not prohibited by law. Another difficulty of the FDM approach implemented in a system with many transmitters (such as a MIMO array) is the creation of range induced phase offset at each transmitter that needs to be compensated. Further, irreducible phase ambiguity may result for a radar system with many transmitters when the radar system requires a large array aperture for the application in which the radar system is used.

Examples disclosed herein provide a more efficient transmission scheme that reduces and/or eliminates some of the negative results of conventional TDM and FDM schemes in MIMO radar systems. More particularly, by implementing a MIMO radar system with many transmitters in accordance with techniques disclosed herein, enables relatively high resolution in four dimensions (e.g., elevation, azimuth, range, and radial velocity) without compromising the maximum unambiguous velocity.

Specifically, examples disclosed herein implement transmissions for different transmitters of a MIMO antenna array using compact frequency-time domain separation. As used herein, the term "compact" used in connection with time domain multiplexing and/or frequency domain multiplexing means that, although signals from different transmitters are separated by time and/or by frequency, the signals still have some overlap in both time and frequency. That is, whereas conventional TDM schemes involve transmitting one signal at a time without overlap (e.g., a subsequent signal begins at the end of a previous signal), in examples disclosed herein, a subsequent signal begins before a previous signal ends such that there is an overlapping period during which both signals are being transmitted. Likewise, whereas conventional FDM schemes involve transmitting separate signals at the same time but separated into non-overlapping frequency bands, in examples disclosed herein, separate signals are transmitted at the same time at different frequencies but are modulated across frequency bands that overlap. As described more fully below, the compact time-frequency division multiplexing examples disclosed herein improve the property of the waveform of the transmissions and provide more flexible tradeoff options between different radar specification requirements (e.g., maximum ambiguous velocity, maximum range, range resolution, velocity resolution, etc.). As such, teachings disclosed herein enable a single radio frequency (RF) architecture to support multiple radar modes including long range radar (LRR), medium range radar (MRR), and short range radar (SRR). Furthermore, the advantages achieved by teachings disclosed herein involve relatively low computation complexity baseband processing because most of the processing is implemented based on cross-correlation, fast Fourier transform (FFT), and element-wise operations that may be implemented in computationally efficient manners.

Figure 3:
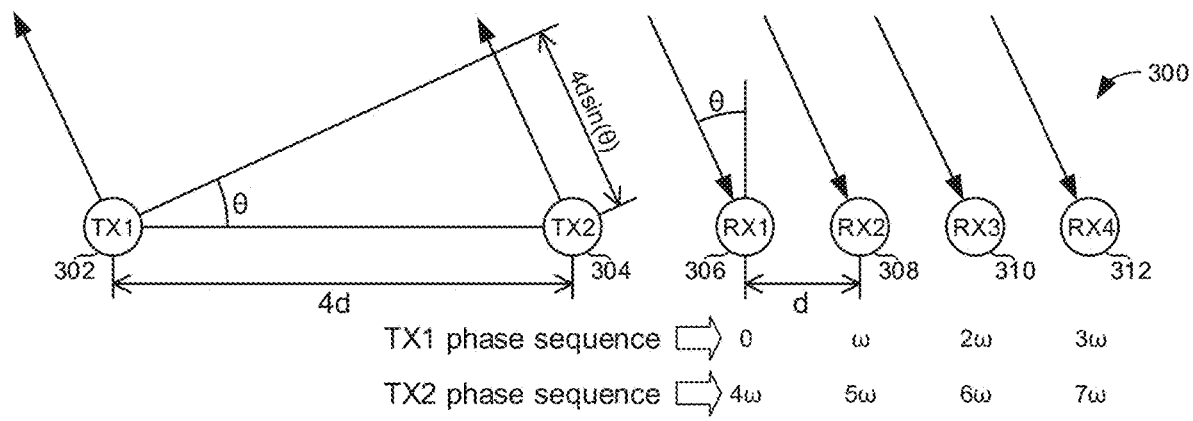
FIG. 3 illustrates an example antenna array for a MIMO radar system.

FIG. 3 illustrates an example antenna array 300 for a MIMO radar system. The antenna array 300 includes two transmitters 302, 304 (labelled TX1 and TX2 respectively) and four receivers 306, 308, 310, 312 (labelled RX1, RX2, RX3, and RX4 respectively). Such an arrangement is referred to as a 2×4 MIMO system. The example antenna array 300 is a relatively simple array for purposes of explanation. Examples disclosed herein may be applied to antenna arrays having any suitable number of transmitters and receivers (which may number in the tens or even a hundred or more depending on available space for the array and cost considerations). Further, the transmitters and receivers may be arranged in any suitable manner including, for example, a one-dimensional array as shown in the illustrated example of FIG. 3 or in a two-dimensional array.

Disregarding any loss of generativity, in a radar beam forming system with a single transmitter and multiple receivers (e.g., a single input multiple output (SIMO) system), the angular resolution of the system may be doubled (resolution bins reduced by half) by doubling the number of receivers. As there is only one transmitter, this results in nearly doubling the total number of antennas. For example, if there was only one transmitter in the illustrated example of FIG. 3, doubling resolution of the radar would require four additional receivers, thereby increasing the total number of antenna elements from 5 to 9. By contrast, in a MIMO radar system, the angular resolution can be doubled merely by doubling the number of transmitters. Thus, the angular resolution of the example system illustrated in FIG. 3 can be doubled by adding two more transmitters, thereby increasing the total number of antenna elements from 6 to 8. As such, higher angular resolutions are possible with a MIMO system with fewer antennas.

As shown in FIG. 3, a transmission from the first transmitter 302 results in a phase of [0 ω 2ω 3ω] at the four receivers 306, 308, 310, 312, respectively, with the first receiver 306 as a reference. As shown in the illustrated example, the second transmitter 304 is placed a distance (4d) from the first transmitter 302 that is four times the distance (d) between the receivers 306, 308, 310, 312. As a result, where d is measured in meters, any signal emanating from the second transmitter 304 traverses an additional path of length $4d \sin(\theta)$ meters as compared to signals from the first transmitter 302. As such, the signal from the second transmitter 304 detected at each receiver 306, 308, 310, 312 has an additional phase-shift of $4w$ (relative to transmission from the first transmitter 302). Accordingly, the phase of the signal from the second transmitter 304 at the four receivers 306, 308, 310, 312 is [4ω 5ω 6ω 7ω]. Concatenating the phase sequences at the four receivers 306, 308, 310, 312, due to transmissions from both transmitters 302, 304, results in the sequence [0ω 2ω 3ω 4ω 5ω 6ω 7ω]. This is the same sequence that would result from a 1×8 SIMO system. Thus, it can be said that the 2×4 antenna configuration shown in FIG. 3 synthesizes a virtual array of eight receive antennas (with one transmit antenna being implied).

The above example can be generalized to generate a virtual antenna containing $N_{TX}$ and $N_{RX}$ antennas so long as the antennas are properly placed relative to one another. In a MIMO system, the transmission from each transmitter is designed to be separable or distinguishable from all other transmissions from the other transmitters at the receiver. As a result of the separability of the transmitter signals, the system is able to achieve $N_{TX} \times N_{RX}$ degrees of freedom with only $N_{TX}$ transmitters and $N_{RX}$ receivers. By contrast, in a conventional beamforming (SIMO) radar system, only $N_{TX}+N_{RX}$ degrees of freedom are achieved with the same number of transmitters and receivers. Thus, MIMO radar techniques result in a multiplicative increase in the number of (virtual) antennas, while also providing an improvement (e.g., increase) in the angular resolution. If $p_m$ denotes the coordinates of the mth transmitter (m=0, 1, ... $N_{TX}$), and $q_n$ denotes the coordinates of the nth receiver (n=0, 1, 2, ... $N_{RX}$), then the location of the virtual antennas can be computed as $p_m+q_n$, for all possible values of m and n. This can be express mathematically in a compact form as $$r = p \otimes q \quad \text{Eq. 1}$$

where r is the coordinates of the elements in the virtual array, which are based on convolution (denoted by $\otimes$) of the coordinates of the transmitter and receiver elements.

Radar systems commonly use matched filters that involve the correlation of a known signal (e.g., a chirp transmitted by a transmitter) with an unknown signal (e.g., a transmitter signal reflected off a target object and detected at a receiver). Due to the orthogonality of different signals from different transmitters, matched filters based on different transmission signals will only correlate with a signal detected at a receiver that originated from a corresponding transmitter while there will be a mismatch for signals from other transmitters. This is the way in which signals from the separate transmitters are separable at a particular receiver. More particularly, assuming a linear (mis-)matched filter receiver is used, the separation (e.g., distinguishing) of transmitted signals at a given receiver is guaranteed when the following condition is satisfied:

$$s_m(t) * h(t) * p_{m'}(t) = \begin{cases} r_m(t) & \text{for } m = m' \\ 0 & \text{otherwise} \end{cases} \quad \text{Eq. 2}$$

for all possible channel realizations (e.g., radar responses) $h(t)$, where $s_m(t)$ is the transmitted signal from the mth transmitter, $p_{m'}(t)$ is the (mis-)matched filter corresponding to the m'th transmitter applied at the receiver, and $r_m(t)$ is the received signal from the mth transmitter after the matched filtering. The radar response $h(t)$ can be represented as an aggregation of channel responses of L targets with some complex channel gain $$h_i(t) = A_i \delta(t - \tau_i) \quad \text{Eq. 3}$$

where $A_i$ is the reflectivity of the ith target, $\delta(\bullet)$ is the Dirac delta function, and $\tau_i$ is the round trip time delay for the signal reflected off the lth target. Using Equation 3, Equation 1 can be rewritten as $$r_m(t) = s_m(t) * \Sigma_{i=1}^{L} A_i \delta(t-\tau_i)) * p_m(t) = \Sigma_{i=1}^{L} A_i s(t-\tau_i)) * p_m^*(t) \quad \text{Eq. 4}$$

Further, based on matched filtering, Equation 4 can be rewritten as $$r_m(t) = \Sigma_{i=1}^{L} A_i s_m(t-\tau_i)) * s_m^*(t) = \Sigma_{i=1}^{L} A_i r_{m,m}(\tau - \tau_i)) \quad \text{Eq. 5}$$

As described above in connection with FIGS. 1 and 2, the TDM-LFM waveform (FIG. 1) and the FDM-LFM waveform (FIG. 2) guarantee orthogonality by introducing time delay and frequency shifts in the following:

$$s_0(t) = e^{j2\pi f_0 t + \pi \frac{B}{T_c} t^2} \text{rect}\left(\frac{t}{T_c}\right) \quad \text{Eq. 6}$$

where $f_0$ is the center frequency of the radar signal, B is the baseband bandwidth of the signal, and $T_c$ is the chirp length. In both the conventional TDM-LFM waveform defined below in Equation 7 and the conventional FDM-LFM waveform defined below in Equation 8:

$$s_m^{tdm}(t) = s_0(t-(m-1)T_c) \text{ for } m=1,2,\ldots N_{TX} \qquad \text{Eq. 7}$$

$$s_m^{fdm}(t) = s_0(t)e^{j2\pi(m-1)Bt} \qquad \text{Eq. 8}$$

it can be verified that:

$$r_{m,m'}(\tau-\tau_i) = \begin{cases} \chi(\tau-\tau_i) & m=m' \\ 0 & m \neq m' \end{cases} \qquad \text{Eq. 9}$$

where $\chi(\tau)$ is the ambiguity function for LFM waveforms and is given by $$\chi(\tau) = \left(1 - \frac{|\tau|}{T_c}\right)\frac{\sin[\pi B\tau(1-|\tau|/T_c)]}{\pi B\tau(1-|\tau|/T_c)} \qquad \text{Eq. 10}$$

Equation 9 defines a second condition to establish signals that are separable (e.g., orthogonal). For a conventional TDM waveform, the second condition (Equation 9) is achieved by the fact that $$r_{m,m'}^{tdm}(\tau-\tau_i) = \chi(\tau-(m-j)T_c) \approx 0 \qquad \text{Eq. 11}$$

Similarly, for a conventional FDM waveform, the second condition (Equation 9) is achieved by the fact that $$r_{m,m'}^{fdm}(\tau-\tau_i) \approx 0 \qquad \text{Eq. 12}$$

As mentioned above, although orthogonality (hence separation) between transmitter signals is achieved at the receivers based on a conventional TDM or FDM scheme, the time-frequency resources are utilized inefficiently.

Another drawback of the conventional TDM waveform implemented for MIMO systems is that there is a tradeoff between the maximum unambiguous velocity (e.g., the maximum velocity of a target that the radar can reliably measure) and the maximum range (e.g., the maximum distance from the radar at which a target can be reliably detected). This tradeoff is particular problematic for MIMO systems with many transmitters because the maximum unambiguous velocity is inversely proportional to the PRI, which, as discussed above, increases as the number of transmitters increases. Specifically, the maximum unambiguous velocity is defined as $$v_{max} = \lambda/4\text{PRI} \qquad \text{Eq. 13}$$

where $\lambda$ is the operating wavelength of the transmitted signals. Thus, as the number of transmitters increases, the PRI also increases, which results in a reduction in the maximum unambiguous velocity. More particularly, as shown in Table 1 below, doubling the number of transmitters results in the maximum unambiguous velocity being reduced by half

TABLE 1

Unambiguous Velocity Tradeoff: Number of Antenna versus Maximum Range Tradeoff. (Conventional TDM MIMO System)

| Max Range $r_{max}$ (m) | Max Delay $\tau_{max}$ (us) | Max Velocity Num Tx Ant | | | | | | |
|---|---|---|---|---|---|---|---|---|
| | | 1 | 2 | 4 | 8 | 16 | 24 | 32 |
| 50 | 0.33 | 50.60 | 25.30 | 12.65 | 6.32 | 3.16 | 2.11 | 1.58 |
| 100 | 0.67 | 50.60 | 25.30 | 12.65 | 6.32 | 3.16 | 2.11 | 1.58 |
| 150 | 1.00 | 50.60 | 25.30 | 12.65 | 6.32 | 3.16 | 2.11 | 1.58 |
| 200 | 1.33 | 50.60 | 25.30 | 12.65 | 6.32 | 3.16 | 2.11 | 1.58 |
| 250 | 1.67 | 50.60 | 25.30 | 12.65 | 6.32 | 3.16 | 2.11 | 1.58 |
| 300 | 2.00 | 50.60 | 25.30 | 12.65 | 6.32 | 3.16 | 2.11 | 1.58 |

Note:
Chirp length $T_c$ is assumed to be 18.75 us.

Examples disclosed herein achieve greater efficiency than conventional TDM or FDM systems by compacting the waveform in one or both of the time domain and the frequency domain. In particular, the baseband transmitted signal for the mth transmitter in a compact TDM system implemented in accordance with teachings disclosed herein may be written as $$s_m(t) = e^{j\left(2\pi f_0(t-m\tau_{tdm}) + \pi\frac{B}{T_c}(t-m\tau_{tdm})^2\right)}\text{rect}\left(\frac{t-T_c/2-m\tau_{tdm}}{T_c}\right) \qquad \text{Eq. 14}$$

where one cycle of the MIMO sweeps $m=0 \ldots N_{tx}-1$.

Similar to Equation 6 above, the signal waveform $$s_0(t) = e^{j\left(2\pi f_0 t + \pi\frac{B}{T_c}t^2\right)}\text{rect}\left(\frac{t-T_c/2}{T_c}\right) \qquad \text{Eq. 15}$$

is a regular LFM waveform. Therefore, $$s_m(t) = s_0(t-m\tau_{tdm}) \qquad \text{Eq. 16}$$

In order for the example compact TDM waveform of Equation 14 to satisfy the condition given by Equation 2 outlined above, it is necessary for $$\tau_{tdm} \leq \tau_{max} = \frac{2r_{max}}{c} \qquad \text{Eq. 17}$$

where $\tau_{max}$ is determined by the maximum detection range $r_{max}$ defined for the radar system in accordance with desired design specifications. Thus, the example compact TDM waveform may be adapted to many different MIMO systems.

Based on Equations 14 and 17, the chirp cycle in this example is defined by the following equation:

$$\text{PRI} = \max\{r_{tdm}N_{tx}, T_c\} \qquad \text{Eq. 18}$$

For the sake of comparison, the PRI of a conventional TDM waveform is equal to $N_{tx}T_c$. Therefore, the PRI of the example compact TDM waveform is much shorter than the PRI of a conventional TDM scheme because $\tau_{tdm} \ll T_c$. A much shorter PRI means that a much higher maximum unambiguous velocity is possible with higher numbers of transmitters when compared with a conventional TDM approach. More particularly, PRI scales with $\tau_{tdm}$ and, therefore, $r_{max}$, thereby providing a more flexible waveform design that can achieve a consistent maximum unambiguous velocity across systems having different numbers of transmitters as demonstrated by Table 2 below. The range of the number of transmitters associated with a constant maximum unambiguous velocity varies depending on the maximum range specified for the system with greater flexibility in the number of transmitters for shorter ranges. For instances, as shown in Table 2, at a maximum range of 50 m, the maximum unambiguous velocity remains constant for any number of transmitters ranging from 1 to at least 32. At a maximum range of 300 m, the maximum unambiguous velocity remains constant for any number of transmitters ranging from 1 to at least 8. Furthermore, as the number of transmitters increases beyond 8, the unambiguous velocity reduces at a slower rate than in the conventional TDM scheme as shown in Table 1.

TABLE 2

Unambiguous Velocity Tradeoff: Number of Antenna versus Maximum Range Tradeoff (Compact TDM MIMO System)
Max Velocity

| Max Range $r_{max}$ (m) | Max Delay $\tau_{max}$ (us) | Num Tx Ant | | | | | | |
|---|---|---|---|---|---|---|---|---|
| | | 1 | 2 | 4 | 8 | 16 | 24 | 32 |
| 50 | 0.33 | 50.60 | 50.60 | 50.60 | 50.60 | 50.60 | 50.60 | 50.60 |
| 100 | 0.67 | 50.60 | 50.60 | 50.60 | 50.60 | 50.60 | 50.60 | 44.44 |
| 150 | 1.00 | 50.60 | 50.60 | 50.60 | 50.60 | 50.60 | 39.50 | 29.63 |
| 200 | 1.33 | 50.60 | 50.60 | 50.60 | 50.60 | 44.44 | 29.63 | 22.22 |
| 250 | 1.67 | 50.60 | 50.60 | 50.60 | 50.60 | 35.55 | 23.70 | 17.78 |
| 300 | 2.00 | 50.60 | 50.60 | 50.60 | 50.60 | 29.63 | 19.75 | 14.81 |

Note:
Chirp length $T_c = \tau_{tdm} N_{tx}$ with $\tau_{tdm} = \tau_{max} = 2r_{max}/c$.

Furthermore, the fact that the PRI for the compact TDM waveform is defined as the greater of $\tau_{tdm} N_{tx}$ and $T_c$ means that there is flexibility in the system parameters depending on the particular application. In some examples, the system is designed so that $\tau_{tdm} N_{tx} = T_c$ to increase (e.g., maximize) the transmitting power.

Figure 4:
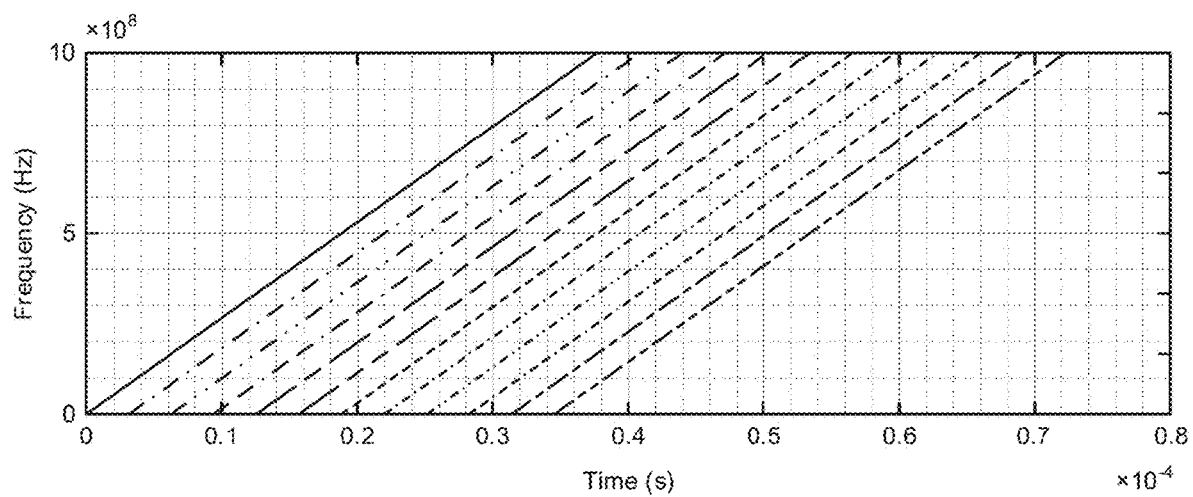
FIG. 4 is a graph illustrating an example compact TDM-LFM waveform corresponding to a single chirp cycle for a radar system with twelve transmitters.

FIG. 4 is a graph illustrating an example compact TDM-LFM waveform corresponding to a single chirp cycle for a radar system with twelve transmitters. As shown in the illustrated example, each successive chirp (from a different transmitter) is temporally spaced by a time delay of approximately 3.1 us, which is much less than ($\frac{1}{12}^{th}$ of) the approximately 37.6 us length of each individual chirp. As a result, there is considerable temporal overlap between the different signals. Indeed, the last signal begins approximately 3.1 us before the first signal ends such that there is a brief period during which all 12 signals are overlapping. The length of each individual chirp is determined based on specifications defined for the radar system including the total number of transmitters and the maximum detection range defined for the system. The 3.1 us time delay between successive ones of the transmitter chirps shown in FIG. 4 is significantly less than the 10 us time delay between successive ones of the chirps shown in the graph of FIG. 1 corresponding to the conventional TDM approach. With the signals much more compact in the time domain as shown in FIG. 4, the total duration of a single chirp cycle for this example compact TDM waveform is approximately 72 us, which is significantly less than the 120 us required for the single chirp cycle shown in FIG. 1 based on the conventional TDM approach. In the illustrated example of FIG. 4, the baseband bandwidth for each chirp is 1 GHz. The bandwidth is determined based on the range resolution specified for the radar system (with 1 GHz corresponding to a 15 cm range resolution).

The baseband transmitted signal for the mth transmitter in a compact FDM system implemented in accordance with teachings disclosed herein may be written as $$s_m(t) = e^{j\left(2\pi(f_0+m\Delta f)t+\pi\frac{B}{T_c}t^2\right)} \text{rect}\left(\frac{t}{T_c}\right) \quad \text{Eq. 19}$$

where one cycle of the MIMO sweeps m=0 . . . $N_{tx}$–1.

Similar to Equation 6 above, the signal waveform $$s_0(t) = e^{j\left(2\pi f_0 t+\pi\frac{B}{T_c}t^2\right)} \text{rect}\left(\frac{t-T_c/2}{T_c}\right) \quad \text{Eq. 20}$$

is a regular LFM waveform. Therefore, $$s_m(t) = s_0(t) e^{j2\pi\left(\lfloor\frac{m-1}{2}\rfloor\Delta f\right)} \quad \text{Eq. 21}$$

In order for the example compact FDM waveform of Equation 19 to satisfy the condition given by Equation 2 outlined above, it is necessary for $$\Delta f < f_{b,max} \leq \frac{2r_{max}}{c}\frac{B}{T_c} \quad \text{Eq. 22}$$

where $\Delta f$ is the FDM frequency spacing between adjacent transmitter signals and $f_{b,max}$ is the maximum beat frequency (e.g., the maximum frequency difference due to the delay of a returned signal and a transmitted signal. As with $\tau_{max}$ defined above for the TDM approach, $f_{b,max}$ is defined relative to the maximum detection range $r_{max}$ specified for the radar system. Thus, the example FDM waveform may be adapted to many different MIMO systems associated with different applications.

Figure 5:
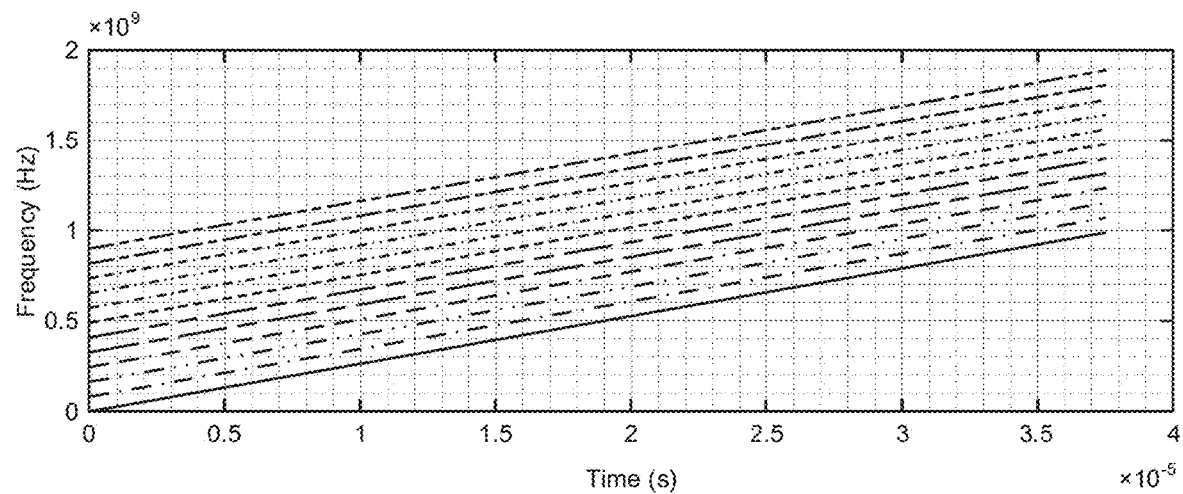
FIG. 5 is a graph illustrating an example compact FDM-LFM waveform corresponding to a single chirp cycle for a radar system with twelve transmitters.

FIG. 5 is a graph illustrating an example compact FDM-LFM waveform corresponding to a single chirp cycle for a radar system with twelve transmitters. As shown in the illustrated example, although all chirps (from the different transmitters) begin at the same time, each chirp is spaced from adjacent chirps by approximately 83 MHz ($\Delta f$=83 MHz), which is much less than ($\frac{1}{12}^{th}$) the approximately 1 GHz frequency band associated with each individual chirp. As a result, there is considerable overlap within the frequency domain between the different signals. Indeed, the highest frequency signal begins at a frequency that is approximately 83 MHz lower than the final frequency of the lowest frequency signal such that there is a small frequency band through which all 12 signals pass. The 83 MHz frequency difference between adjacent ones of the transmitter chirps shown in FIG. 5 is significantly less than the 1 GHz frequency difference between adjacent ones of the chirps shown in the graph of FIG. 2 corresponding to the conventional FDM approach. With the signals much more compact in the frequency domain as shown in FIG. 5, the total frequency bandwidth of a single chirp cycle for this example compact TDM waveform is approximately 1.9

GHz, which is significantly less than the 12 GHz required for the single chirp cycle shown in FIG. 2 based on the conventional FDM approach.

Figure 6:
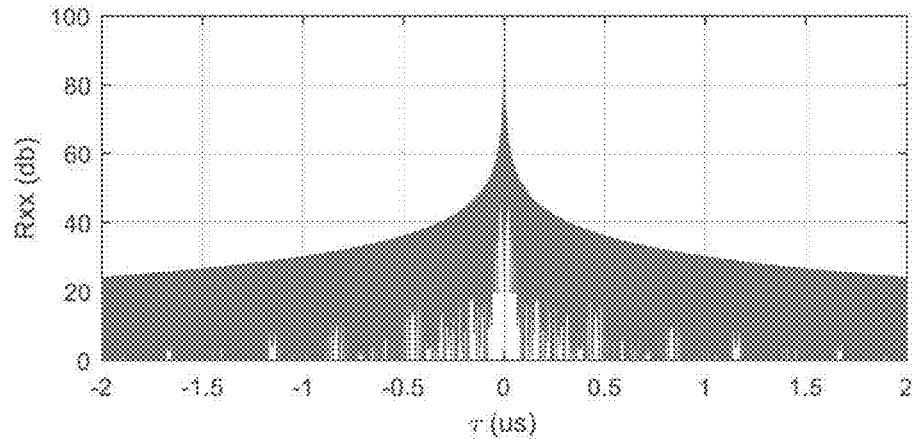
FIG. 6 is a graph representing the autocorrelation function of a LFM waveform corresponding to the example compact waveforms represented in FIGS. 4 and 5.

FIG. 6 is a graph representing the autocorrelation function of a regular LFM waveform similar to that defined in Equation 15 (associated with the compact TDM waveform of Equation 14) and in Equation 20 (associated with the compact FDM waveform of Equation 19). As is evident from the graph, the conditions for orthogonality given by Equation 2 are satisfied. Specifically, at a 2 us delay, the correlation drops by more than 75 dB. As such, the separability and/or distinguishability of signals from different transmitters is achieved. While the 2 us delay does not achieve full orthogonality in a strict mathematical sense (such that the correlation is zero), the correlation has dropped sufficiently to enable the different signals to be treated as orthogonal in a practical sense for purposes of separation at a receiver.

In some examples, the waveform and associated parameters to be used by a particular MIMO system (e.g., the waveform defined by Equation 14 for a compact TDM implementation or the waveform defined by Equation 19 for a compact FDM implementation) are stored in memory accessible by the transmitters. In some examples, the waveform may be repeated a predetermined number of times when being transmitted such that a full radar frame includes multiple chirp cycles through each of the transmitters. The particular number of chirp cycles for a full radar frame may depend on particular design specifications for the radar including factors such as Doppler resolution and/or integration time.

Figure 7:
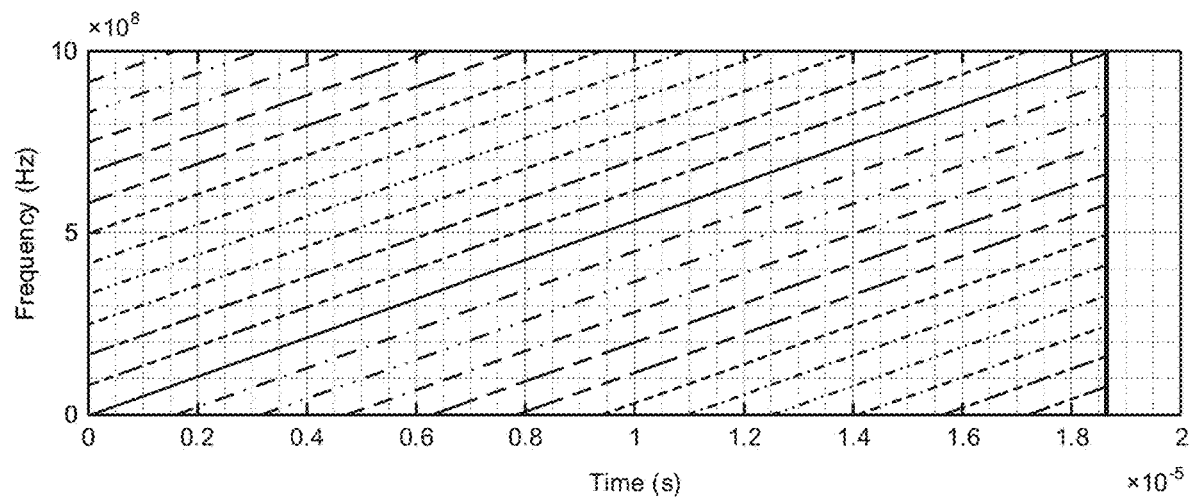
FIG. 7 is a graph illustrating an example chirp cycle for a compact TDM-FDM waveform for a radar system with twelve transmitters.
Figure 8:
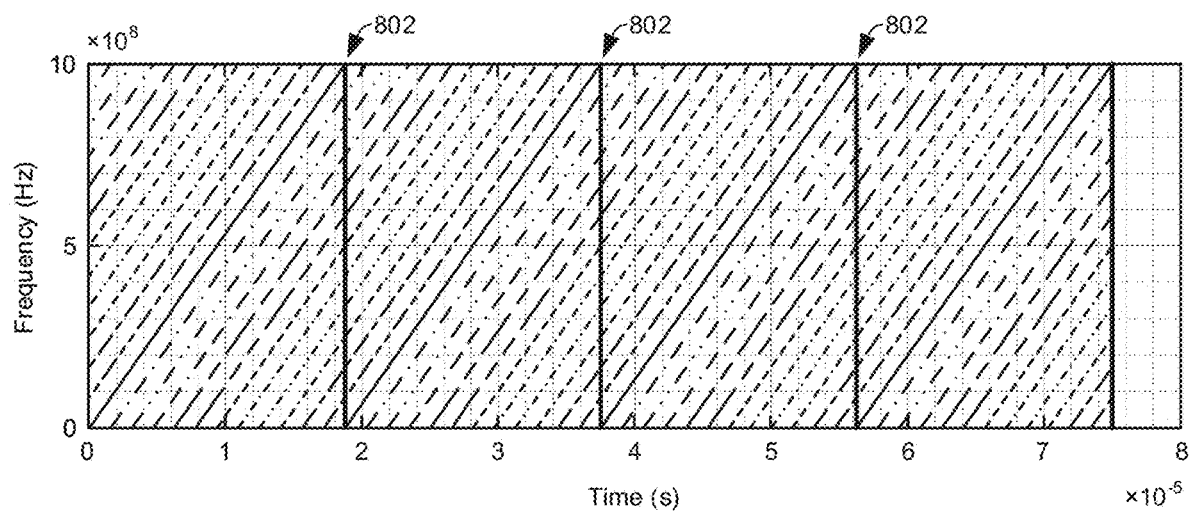
FIG. 8 is a graph illustrating an example radar frame including a series of four repetitions of the example chirp cycle of FIG. 7.

In some examples, to reduce the amount of buffering at both the transmitter side and the receiver side of the radar, a circular chirp cycle is used, which may be defined by $$s_m^{circ}(t) = s_m(\text{mod}(t, T_c)) \quad \text{Eq. 23}$$

where mod (t, $T_c$) is the modulo operation that returns the remainder of t/$T_c$. An example of this waveform is illustrated in the graph of FIG. 7 and the example waveform is shown repeated four times in the graph of FIG. 8 to form a complete circular chirp cycle radar frame. In this example, signals from each transmitter begin at the same time but are spaced apart in the frequency domain. Additionally, as shown in the illustrated example, different ones of the signals from different transmitters begin at temporally spaced points in time in the time domain. Thus, the example waveform of FIGS. 7 and 8 is a combination of both the compact TDM and the compact FDM approaches described above. More particularly, as shown in the illustrated example of FIG. 7, with the exception of the signal that begins at a frequency of f=0 at time t=0 (represented by the solid line in the illustrated example), the signal from each transmitter within a single chirp cycle begins and ends at the same frequency. As a result, the repetition of the chirp cycle multiple times (as shown in FIG. 8) results in the signals continuing in the next cycle at the frequency where the signal left off in the previous cycle. Stated differently, with the exception of the chirp that begins at a frequency of f=0 at time t=0 (e.g., the chirp represented by a solid line), a full chirp from each individual transmitter that spans the full frequency bandwidth of the radar signal crosses individual chirp cycle boundaries 802. In some examples, the individual chirp cycles are stitched together in the baseband before processing.

Implementing compact time and/or frequency division multiplexing as disclosed herein may result in leakage in the frequency domain (due to the sinc( ) shape of the rectangular pulse and imperfections in the receiver chain) and/or in the time domain (due to leakage in a matched filter window). As a result, a strong target at a close range may cause sidelobes that are strong enough to mask a target at a farther range. Accordingly, in some examples, the signals transmitted by the transmitters are generated in conjunction with a window function (also known as a tapered function). That is, the transmitters may be configured to transmit a windowed waveform defined as follows:

$$s_0(t) = e^{j(2\pi f_0(t) + \pi \frac{B}{T_c}(t)^2)} w_\alpha\left(\frac{t - T_c/2}{T_c}\right) \quad \text{Eq. 24}$$

where $w_\alpha$ is a window function. The window function serves to improve orthogonality and reduce frequency emission problems such as the masking of a distant target by a close-range target. Further, the window function can reduce other unwanted effects at the receiver such as a raised noise floor. Any suitable window function may be implemented. In some examples, the window function is the Tukey window, which is defined by $$w_\alpha(n) = \begin{cases} \frac{1}{2}\left[1 + \cos\left(\pi\left(\frac{2n}{\alpha(N-1)} - 1\right)\right)\right] & 0 \leq n < \frac{\alpha(N-1)}{2} \\ 1 & \frac{\alpha(N-1)}{2} \leq n < (N-1)\left(1 - \frac{\alpha}{2}\right) \\ \frac{1}{2}\left[1 + \cos\left(\pi\left(\frac{2n}{\alpha(N-1)} - \frac{2}{\alpha} + 1\right)\right)\right] & (N-1)\left(1 - \frac{\alpha}{2}\right) < n \leq (N-1) \end{cases} \quad \text{Eq. 25}$$

The window function $w_\alpha(n)$ of Equation 25 can be regarded as a cosine lobe of width $\alpha N/2$ that is convolved with a rectangular window of width $(1-\alpha/2)N$. At $\alpha=0$ the window function becomes rectangular, and at $\alpha=1$ the window function becomes a Hann window.

Figure 9:
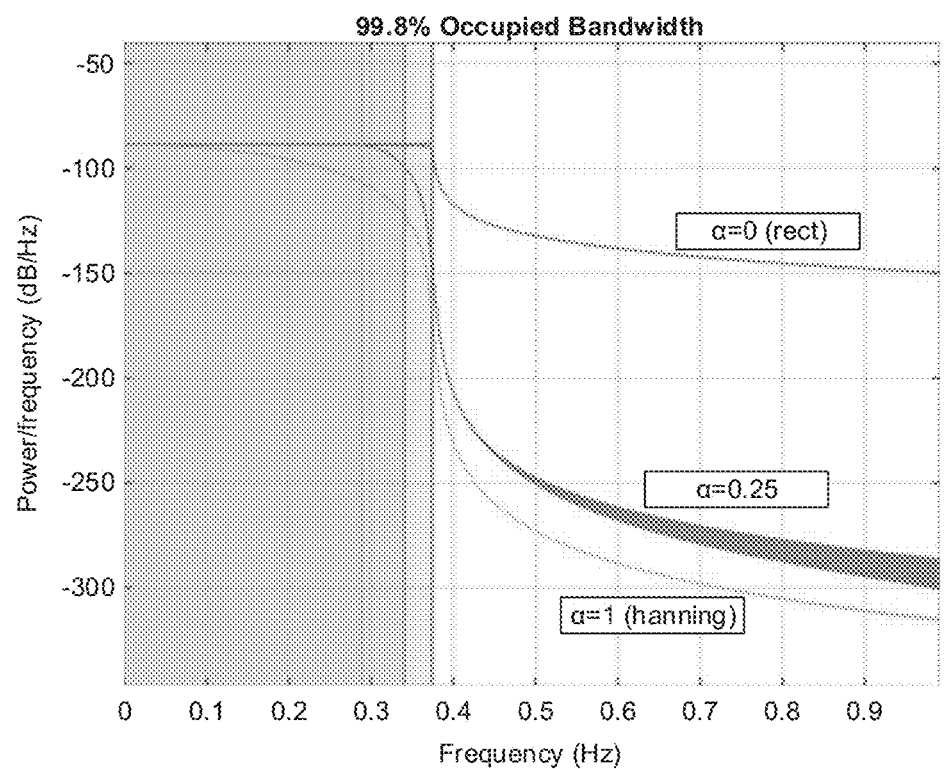
FIGS. 9 and 10 are graphs illustrating the effect of a Tukey window on the LFM waveform associated with FIG. 6.
Figure 10:
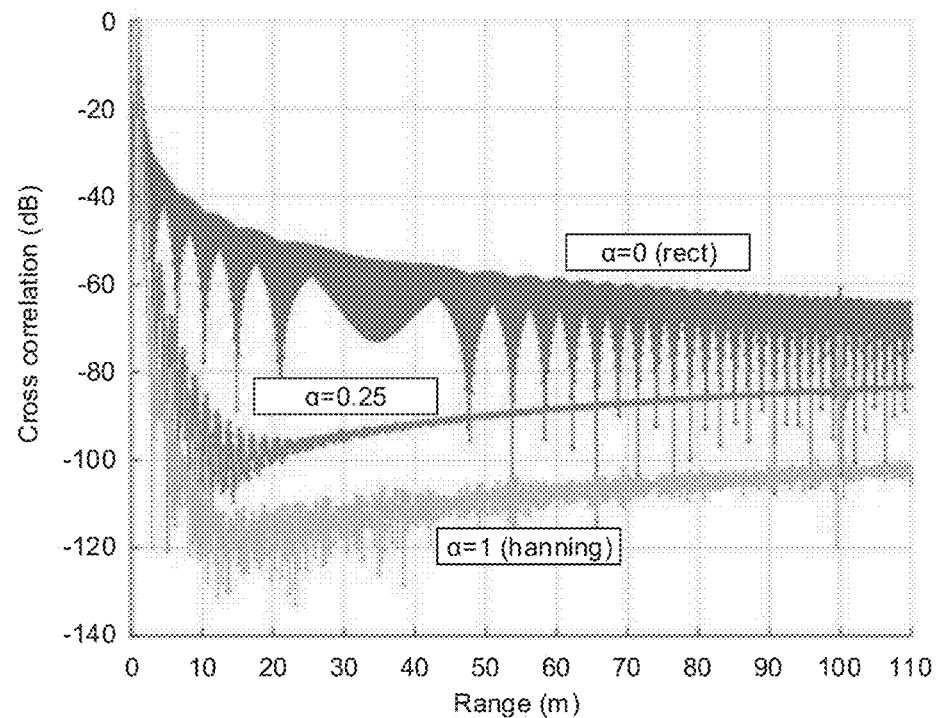

FIG. 9 is a graph illustrating the effect of the Tukey window (Equation 25) on the LFM waveform defined in Equation 24 in the frequency domain with $\alpha=0$ (rectangular window), 0.25, and 1 (Hann window). As demonstrated in FIG. 9, the out-of-band leakage is significantly reduced by the window function, particularly as a approaches 1. FIG. 10 is a graph illustrating the effect of the Tukey window (Equation 25) on the LFM waveform defined in Equation 24 to detect a distant target (at 100 m) when there is a much closer target (at or near 0 m). In FIG. 10, the uppermost curve represents the cross correlation of radar signals while applying the window function with $\alpha=0$, the intermediate curve represents the result of applying the window function with $\alpha=0.25$, and the bottom curve represents the result of applying the window function with $\alpha=1$. As demonstrated by a comparison of the curves in FIG. 10, while the target is significantly masked by the close range target, when the window function is used, the ability of the system to detect the far target is significantly improved.

Figure 11:
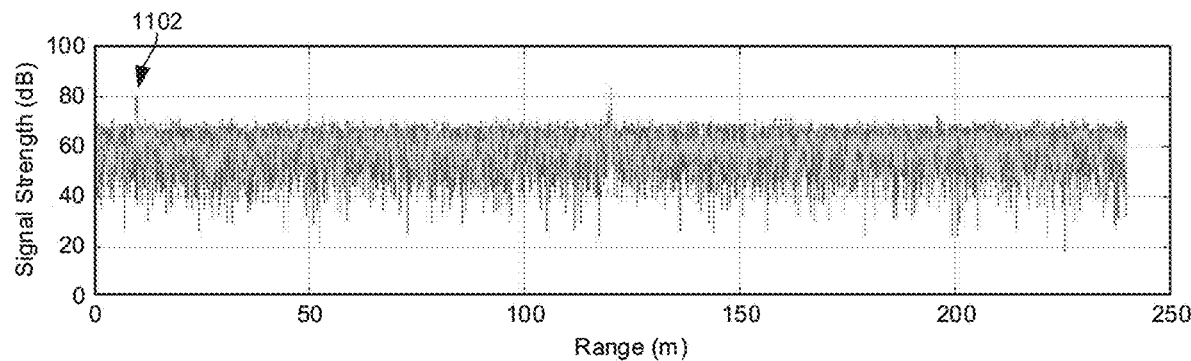
FIG. 11 is a graph representing an example response of a radar system detecting a target at 120 m and 250 m.

As discussed above, different transmitter signals generated based on the compact TDM waveform defined in Equation 14 can be separated at a receiver so long as the maximum signal delay ($\tau_{tdm}$) is less than or equal to the maximum delay ($\tau_{max}=2r_{max}/c$). In some situations, this requirement defining the upper limit of the maximum signal delay ($\tau_{tdm}$) may be violated when a strong radar signal reflector is present at a distance greater than the specified maximum range ($r_{max}$) of the system. In such situations, the reflected signal may leak into the cross-correlation window of the next antenna to appear as a phantom target at a closer range than the actual reflector as demonstrated by the graph shown in FIG. 11. Specifically, FIG. 11 is a graph representing an example response of a radar system detecting a target at 120 m and 250 m. However, in this example, the maximum range ($r_{max}$) for the radar is set to 240 m such that the 250 m target is not detected at its actual range but appears as a phantom target at 10 m (as indicated by the spike 1102).

In some examples, to mitigate against the generation of phantom targets in this manner, a slow time phase coding scheme is applied to scramble each chirp within each chirp cycle of a full circular chirp cycle radar frame. Specifically, in some examples a random (or quasi-random) initial phase rotator (e.g., a scrambling code) is applied to each transmitted chirp over K chirp cycles of a radar frame. More particularly, a transmitted signal from the mth transmitter may be defined as:

$$x_m(t)=\Sigma_{k=0}^{K-1} c_{m,k} s_m(t-kT_c) \qquad \text{Eq. 26}$$

where $c_{m,k}$ is the scrambling phase code applied to the mth transmitter of the kth chirp cycle. The range response for the mth transmitter at the kth chirp cycle caused by the lth target at a certain receiver can be expressed as:

$$y_{m,k,l} = c_{m,k} \alpha_l e^{j2\pi f_0 \tau_l} e^{j v_l T_c k} \qquad \text{Eq. 27}$$

where $\alpha_l$ is the complex gain, $\tau_l$ is the signal delay, and $v_l$ is the Doppler frequency shift caused by the lth target. In some examples, an inverse phase rotator (e.g., the conjugate of the scrambling code) is applied to the range response for the assumed transmitter as follows:

$$\tilde{y}_{m,k,l} = \text{conj}(c_m) y_{m,k,l} = \alpha_l e^{j2\pi f_0 \tau_l} e^{j v_l T_c k} \qquad \text{Eq. 28}$$

After the inverse phase code is applied, the phase term of the signal may be recovered by performing a K-point FFT along the Doppler dimension. This FFT analysis is performed for each signal received at each receiver to generate phase values for different Doppler cells or bins associated with different velocities detectable by the radar system (e.g., up to the maximum unambiguous velocity). The sizes of the Doppler cells correspond to the velocity resolution of the associated radar system.

As mentioned above, in some examples, the phase code for each transmitter is generated in a random or pseudorandom manner. Many different pseudorandom sequences may be implemented that provide good cross-correlation properties including, for example, a uniform random phase rotator, a Hadamard matrix, a (nested) Barker code, a Gold code, etc.

In situations where a strong reflector is positioned at a long distance (e.g. $\tau_{max}<\tau_l<2\tau_{max}$), the reflected signal (originating from the mth transmitter) leaks into the (m+1)-th transmitter's cross-correlation window. As a result, the inverse phase rotator corresponding to the assumed transmitter (m+1) will be the wrong scrambling phase code. In other words, the scrambling phase code selected for application to the received response signal will mismatch with the intended one as shown below in Equation 29:

$$\tilde{y}_{m,k,l} = \text{conj}(c_{m,k}) c_{m-1,k} \alpha_l e^{j2\pi f_0 \tau_l} e^{j v_l T_c k} \qquad \text{Eq. 29}$$

The residual term $c_{m,k}*c_{m-1,k}$ results in the signal being spread or scrambled across the entire Doppler field after the K-point FFT performed along the k-dimension, thereby suppressing the detection of a phantom target generated by the strong reflector beyond the maximum range of the radar. In some examples, further suppression of a phantom target is achieved by performing angle of arrival processing using a two-dimensional FFT as discussed further below. An additional benefit of the scrambling is that it functions as a multiplicative dithering that spreads various impairments (e.g., quantization, local oscillator leakage, and non-linearity) across the Doppler domain. Significantly, unlike additive dithering, the phase code scrambling disclosed herein does not increase the overall noise.

Calculating and/or estimating the range of targets detected by a radar system is accomplished based on a cross-correlation between a transmitted signal ($s_m(t)$) from the mth transmitter and the corresponding received signal reflected off the targets. More particularly, the received signal from a target with a two-way delay of $\tau$ and complex scaling factor A (e.g., amplitude) at the nth receiver can be written as:

$$r_m(t)=A_{m,n} s_m(t-\tau_{m,n}) \qquad \text{Eq. 30}$$

By design, the modulation of the signals from different transmitters under time shifts (e.g., based on TDM) are orthogonal in that:

$$\int_0^{T_c} s_m(t-\tau) s_n^*(t) dt = 0 \qquad \text{Eq. 31}$$

for $0 \le \tau_{m,n} < \tau_{max}$ and $m \ne n$ with $T_c$ being the chirp cycle time (the correlation window). Further, $$\int_0^{T_c} s_m(t-\tau) s_m^*(t) dt = \chi_{ss}(\tau) \approx \delta(\tau) \qquad \text{Eq. 32}$$

Equations 31 and 32 suggest that a matched filtering processing can be applied to separate or distinguish signals from different transmitters received at a receiver. The example windowed compact TDM-LFM waveforms disclosed above satisfy the requirements defined by Equations 31 and 32. As such, after different signals received at particular receivers have been separated to be associated with corresponding transmitters, ranges of targets can be calculated based on a cross-correlation analysis of the signals. In some examples, the results of the cross-correlation analysis are placed into different cells or bins associated with different ranges. The sizes of the cells correspond to the range resolution of the associated radar system. In some examples, the range values are aggregated with the Doppler (e.g., velocity) values in a matrix of cells or bins across both range and velocity. The combination of the range and doppler analysis to produce a matrix of cells with the outputs of such analysis is often referred to as range-Doppler processing.

Figure 12:
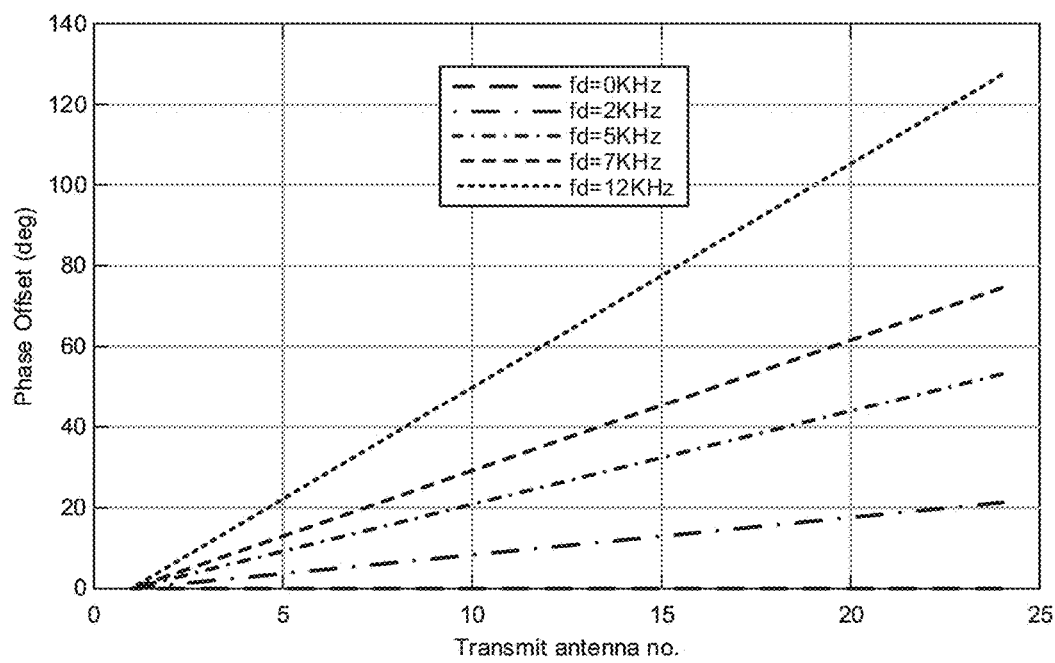
FIG. 12 is a graph providing example phase offset values associated with different transmitters transmitting signals based on the compact TDM-LFM waveform defined in connection with FIG. 4.

The output of range-Doppler processing of received signals can include significant phase offsets due to the angle of arrival in a given range-Doppler cell for each target detected. Furthermore, additional phase offset may arise from the time delay ($\tau_{tdm}$) between the time-staggered transmissions of the compact TDM waveform by successive ones of the transmitters and the Doppler motion of a moving target. The phase offset for signals associated with the mth transmitter due to the Doppler motion for a particular target is given by $$\phi_{moffset} = \underbrace{e^{j(2\pi f_0(m-1)\tau_{tdm} - \pi\gamma(m-1)\tau_{tdm}^2)}}_{\text{Initial phase due to Tx start delay}} \underbrace{e^{j2\pi f_d(m-1)\tau_{tdm}}}_{\text{Motion induced phase}} \quad \text{Eq. 33}$$

where $f_0$ is the carrier frequency, $f_d$ is the Doppler shift of the particular target, and $\gamma$ is the sweep slope of the LFM waveform. As noted in Equation 33, the first term corresponds to the initial phase due to the start delay of the particular transmitter (m=0, 1, . . . $N_{TX}$). The second term corresponds to the phase induced by motion of the corresponding target. FIG. 12 is a graph providing example phase offset values associated with different transmitters (ordered from 1 up to 24 in this example) transmitting signals in a time staggered manner based on a uniform time spacing ($\tau_{tdm}$) of 1.25 us for targets having different Doppler shifts. As demonstrated by the graph in FIG. 12, the phase offset can be significant and is higher for targets associated with higher Doppler shift (e.g., faster moving targets) and higher for signals transmitted by transmitters at times later in a chirp cycle.

In some examples, the phase offset due to Doppler motion is compensated for by first estimating the phase offset based on the Doppler values obtained from the range-Doppler processing and based on the a priori known transmitter waveform time offsets ((m−1)$\tau_{tdm}$). More particularly, in some examples, the phase offset for each Doppler cell is calculated based on the velocities corresponding to the center of each cell. In some examples, these values are calculated and stored in advance to support a full four-dimension (4D) FFT based processing. Once calculated, the estimated phase offset values may be used to compensate the values in the corresponding range-Doppler cells obtained from each transmitter-receiver pair of the antenna array. In some examples, this Doppler motion compensation is implemented before estimation of the two-dimensional (2D) angle of arrival estimation described further below.

Just as Doppler motion can cause phase offsets due to the time offsets of the different transmitters in examples based on the compact TDM waveform disclosed herein, different ranges of targets can cause phase offsets due to the frequency offsets of the different transmitters in examples based on the compact FDM waveform disclosed herein. In particular, the center frequency spacing ($f_m$) of the example compact FDM waveforms from the different transmitters (m=0, 1, . . . $N_{TX}$) results in a phase offset due to the range (r) of a particular target defined as follows:

$$f_m = f_1 + (m-1)\Delta f + \gamma t \quad \text{Eq. 34}$$

$$\phi_{moffset\_r} = e^{j\frac{2\pi(m-1)\Delta fr}{c}} \quad \text{Eq. 35}$$

In some examples, the phase offset due to range is compensated for by first estimating the phase offset based on the range values obtained from the range processing and based on the a priori known transmitter waveform frequency offsets ((m−1)$\Delta f$). Once calculated, the estimated phase offset values may be used to compensate the values in the corresponding range-Doppler cells obtained from each transmitter-receiver pair of the antenna array. In some examples, this range-based phase offset compensation is implemented before estimation of the two-dimensional (2D) angle of arrival (AOA) estimation described further below.

The significance of Doppler motion compensation and/or range motion compensation is demonstrated with reference to FIGS. 13-16, which provide graphs of response profiles generated for a three point moving target simulation. In particular the parameters for the simulation are provided in Table 3, which defines the range, azimuth, elevation, velocity, and radar cross-section (RCS) for the three simulated moving points.

TABLE 3

Parameters for Three Point Moving Target Simulation

| Target | Range (m) | Azimuth (Deg) | Elevation (Deg) | Velocity vector (m/s)* | Mean RCS |
|---|---|---|---|---|---|
| 1 | 99.93 | −45 | 10 | [0 0 0] | 50 |
| 2 | 45 | 0 | 0 | [0 6 0] | 30 |
| 3 | 33 | 30 | 0 | [0 −12 0] | 30 |

Notes:
*velocity is defined as a 3D vector in a global coordinate system.
Radar is placed at [0, 0, 0] and facing [0, 1, 0] direction.

Figure 13:
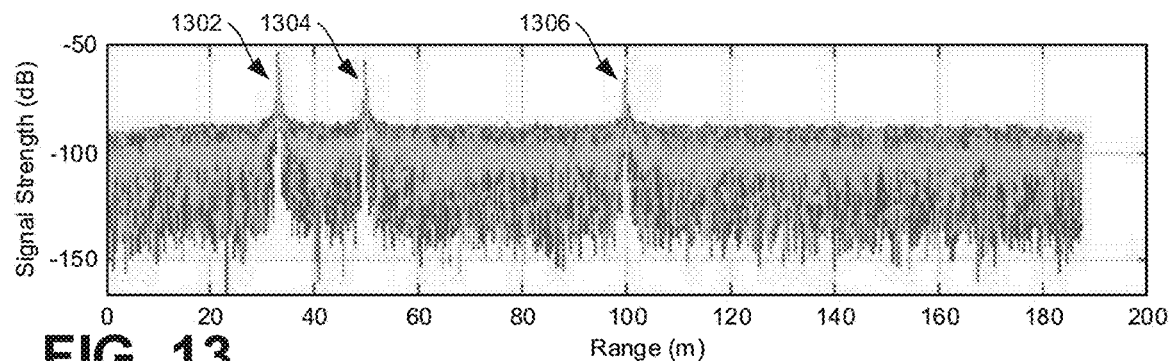
FIG. 13 is a graph representative of an example range profile resulting from a simulation of three moving point targets.
Figure 14:
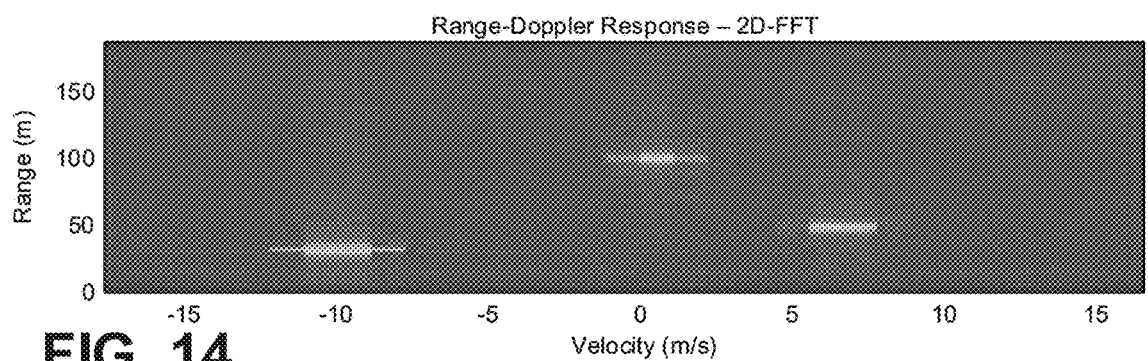
FIG. 14 is a graph representative of an example range-doppler profile identifying the calculated ranges and velocities for each of the three targets in the simulation associated with FIG. 13.
Figure 15:
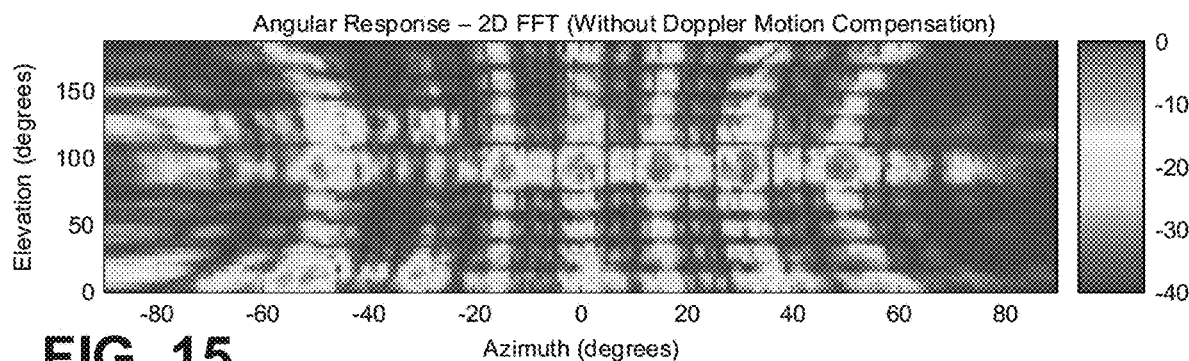
FIG. 15 is a graph representative of the angular profile generated for the three targets in the simulation associated with FIGS. 13 and 14 without Doppler motion compensation.
Figure 16:
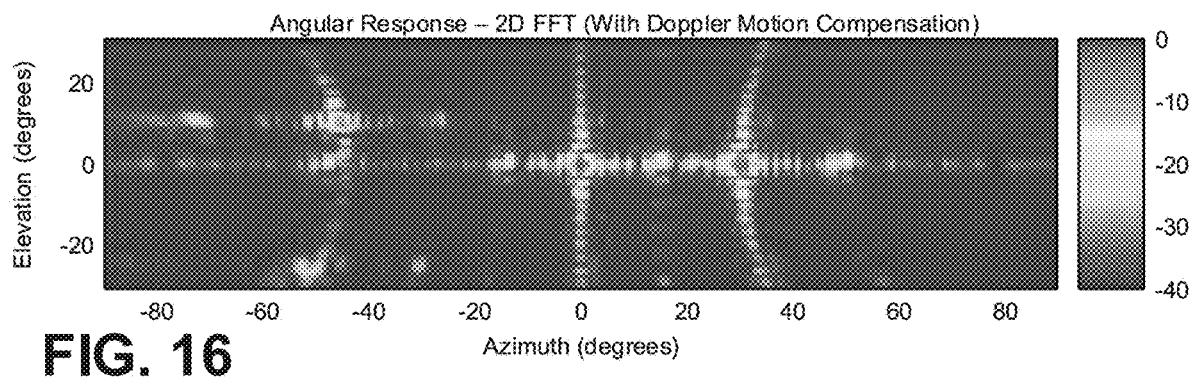
FIG. 16 is a graph representative of the angular profile generated for the three targets in the simulation associated with FIGS. 13-15 after Doppler motion compensation.

With reference to the drawings, FIG. 13 is a graph representative of an example range profile for the three moving targets simulation. As shown in the graph, the simulated three points are identified at their respective ranges based on the three spikes 1302, 1304, 1306 in the range profile. FIG. 14 is a graph representative of an example range-doppler profile identifying the calculated ranges and velocities for each of the three simulated targets. FIG. 15 is a graph representative of the angular profile generated based on a 2D angle of arrival (AOA) estimation for the three simulated targets without Doppler motion compensation. As shown in FIG. 15, the results of the AOA estimation are not reflective of the actual elevation and azimuth for each of the three simulated targets because no motion compensation was implemented. By contrast, FIG. 16 is a graph representative of the angular profile generated based on a 2D angle of arrival (AOA) estimation for the three simulated targets after Doppler motion compensation. As shown in FIG. 16, the angular profile identifies three points that correspond to the simulated values for the elevation and azimuth of the three targets.

As mentioned above, the phase sequence of [0ω 2ω 3ω] associated with the first transmitter 302 of FIG. 3 and the phase sequence of [4ω 5ω 6ω 7ω] associated with the second transmitter 304 in FIG. 3 can be concatenated to form the sequence [0ω 2ω 3ω 4ω 5ω 6ω 7ω] that models a virtual array of eight receivers. In a similar way, based on the known physical arrangement of the elements (transmitters and receivers) in any type of antenna array and the radar signal waveform, the signals associated with each transmitter-receiver pair can be rearranged to model a virtual array corresponding to a different arrangement of array elements. In some examples, the signals associated with each transmitter-receiver pair are rearranged to correspond to a virtual uniform rectangular array for purposes of performing AOA estimation. An advantage of implementing AOA estimations using a virtual uniform rectangular array is that the analysis can be performed using FFT processing, which is much more efficient than conventional approaches involving computationally intensive discrete Fourier transforms (DFTs).

A uniform rectangular MIMO array may be fully described by four parameters including column (azimuth) spacing ($d_x$), the row (elevation) spacing ($d_z$), the number of columns (M), and the number of rows (N). Based on these parameters, the position of an antenna element in the pth column and the qth row of an array is given by $$p_{i,j} = [pd_x, 0, qd_z]^T \qquad \text{Eq. 36}$$

where the array norm (boresight) vector is defined as $[0,1,0]^T$ (e.g., the positive direction of the y axis). In some examples, the signals received at each receiver corresponding to the different transmitters are arranged within a matrix corresponding to the rows and columns of a virtual uniform rectangular MIMO array defined by Equation 36.

In some examples, the values corresponding to the received signals populating the virtual MIMO array matrix have already been modified to compensate for any phase offset due to range or Doppler effects as described above. Accordingly, the input signal model from the ith target follows the canonical model:

$$r_{i,m,n} = r_{0,0} e^{j\frac{2\pi}{\lambda}(md_x \cos\phi_i \cos\theta_i + nd_z \sin\phi_i)} \qquad \text{Eq. 37}$$

where θ is elevation arrival angle and ϕ is the azimuth arrival angle. As provided in Equation 37, each pair of (θ, ϕ) elevation and azimuth arrival angle correspond to a 2D spatial frequency $$(u, v) = \left(\frac{d_x}{\lambda} \cos\phi \cos\theta, \frac{d_z}{\lambda} \sin\phi\right).$$

The values for the spatial frequency signals can be constructed by a 2D-FFT operation in the following manner:

$$y_{i,k,l} = \sum_{k,l}^{M-1,N-1} r_{i,0,0} e^{j\frac{2\pi}{\lambda}(md_x \cos\phi_i \cos\theta_i + nd_z \sin\phi_i)} e^{-j2\pi\left(\frac{k}{M}m + \frac{l}{N}n\right)} \qquad \text{Eq. 38}$$

$$= \operatorname{sinc}\left(\pi\left(k - M\frac{d_x}{\lambda}\cos\phi\cos\theta\right)\right) \operatorname{sinc}\left(\pi\left(l - N\frac{d_z}{\lambda}\sin\phi_i\right)\right)$$

where k and l are the discretized indices of the 2D spatial frequency (u, v). In some examples, the FFT operation uniformly samples in the normalized frequency domain on the lattice $$\left\{0, \frac{1}{M}, \ldots, \frac{M-1}{M}\right\} \cup \left\{0, \frac{1}{N}, \ldots, \frac{N-1}{N}\right\}$$

or equivalently in the symmetrical fundamental region indexed by $$\left\{\frac{-\lfloor M/2 \rfloor}{M}, \frac{-\lfloor M/2 \rfloor + 1}{M}, \ldots, \frac{\lfloor (M-1)/2 \rfloor}{M}\right\} \cup$$

$$\left\{\frac{-\lfloor N/2 \rfloor}{N}, \frac{-\lfloor N/2 \rfloor + 1}{N}, \ldots, \frac{\lfloor (N-1)/2 \rfloor}{N}\right\}.$$

Solving the following equations:

$$\begin{cases} \dfrac{l}{N} = \dfrac{d_z}{\lambda} \sin\phi \\ \dfrac{k}{M} = \dfrac{d_x}{\lambda} \cos\phi \cos\theta \end{cases} \qquad \text{Eq. 39}$$

with $l = -\left\lfloor \dfrac{N}{2} \right\rfloor, \ldots, \left\lfloor \dfrac{N-1}{2} \right\rfloor$ and $k = -\left\lfloor \dfrac{M}{2} \right\rfloor, \ldots, \left\lfloor \dfrac{M-1}{2} \right\rfloor$, gives $$\phi_l = \arcsin\left(\frac{l}{N} \cdot \frac{\lambda}{d_z}\right) \qquad \text{Eq. 40}$$

$$\theta_{k,l} = \arcsin\left(\frac{k}{M} \cdot \frac{\lambda}{d_x} \cdot \frac{1}{\cos\phi_l}\right) + \frac{\pi}{2} \qquad \text{Eq. 41}$$

Equations 40 and 41 define the corresponding spatial sampling points in the angular domain. Notably, the spatial sampling points are only defined on the region defined by $$\left\{(l, k) : \left|\frac{l}{N} \cdot \frac{\lambda}{d_z}\right| < 1 \text{ and } \left|\frac{k}{M} \cdot \frac{\lambda}{d_x} \cdot \frac{1}{\cos\phi_l}\right| < 1\right\} \qquad \text{Eq. 42}$$

because arcsin( ) is only defined in the interval of [−1, 1]. FIG. 16, discussed above, provides an example mapping of the angular frequency (normalized) to angle (degrees) based on the outputs of Equations 40 and 41 for the three point moving target simulation defined by Table 3.

Figure 17:
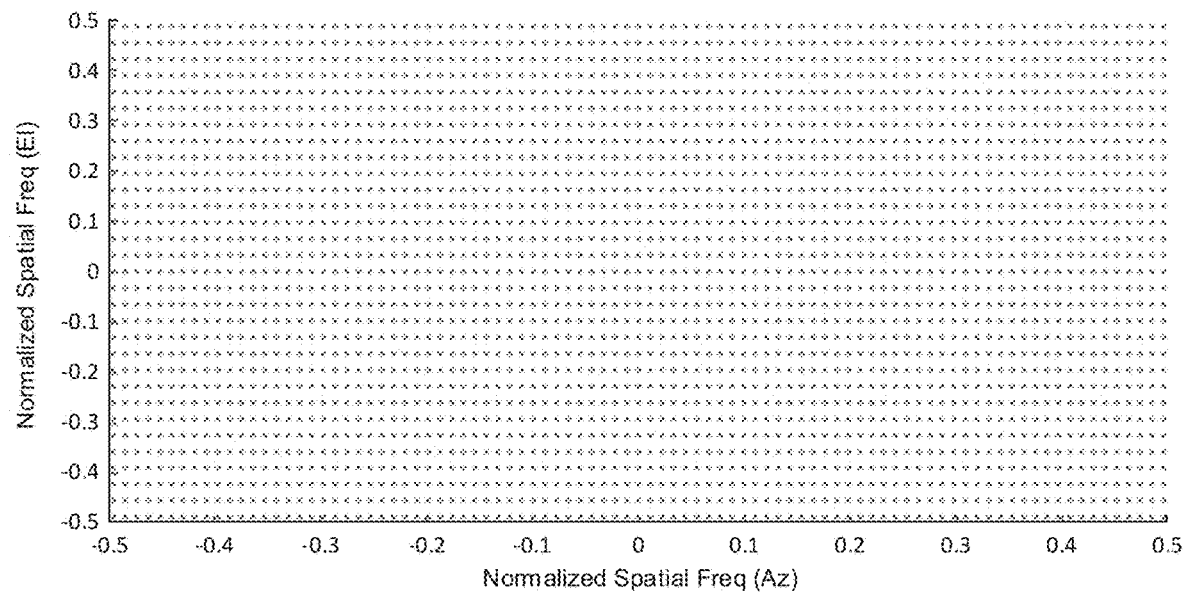
FIG. 17 is a generic graph representing a plot of 2D-FFT normalized (e.g., uniform rectangular) spatial frequency sampling points representative of the angle of arrival estimation for targets detected by a radar system.
Figure 18:
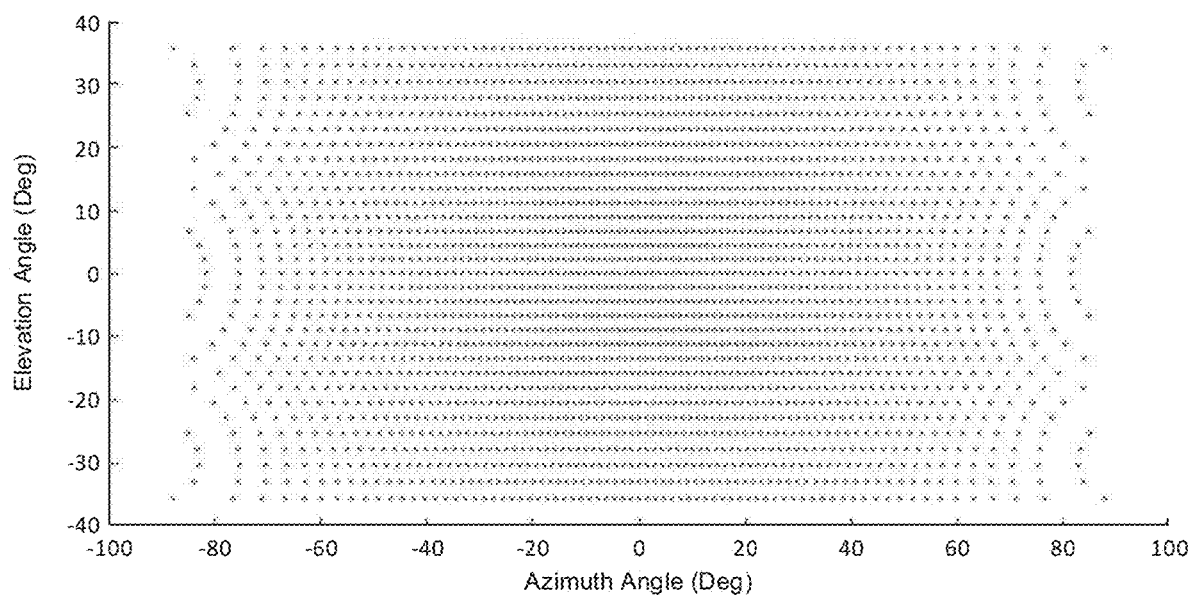
FIG. 18 is a generic graph representing angular (degree) sampling points in a nonuniform (e.g., polar) grid corresponding to the same sampling points represented in the graph of FIG. 17.
Figure 19:
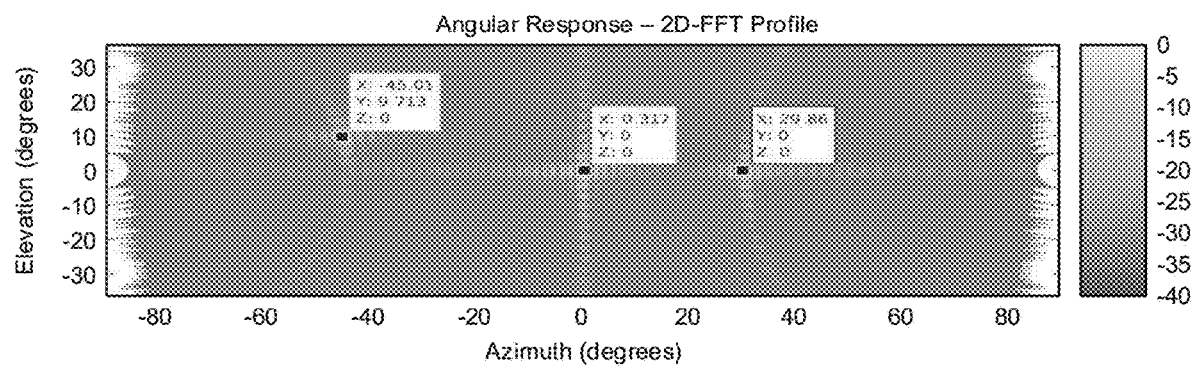
FIG. 19 is an example polar grid visualization of the angular response corresponding to the three targets in the simulation associated with FIGS. 13-16.
Figure 20:
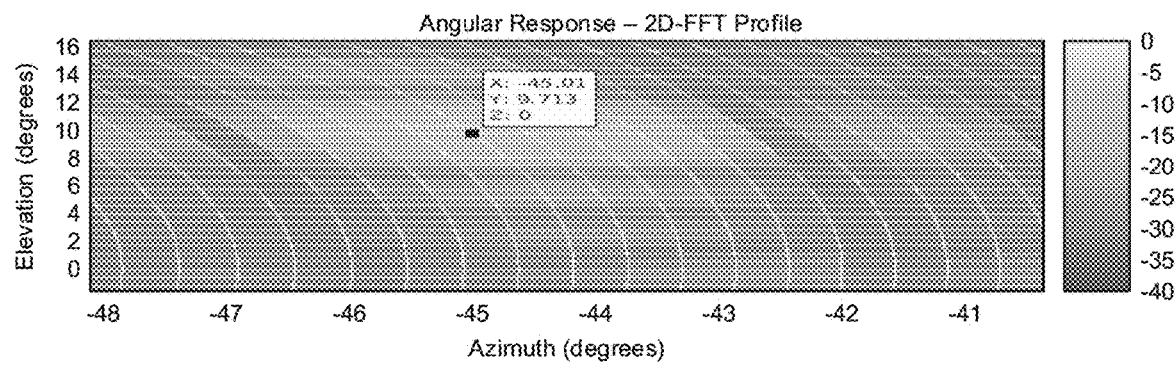
FIG. 20 is a zoomed in view of the example polar grid visualization of FIG. 19.

While the output of the AOA estimation may be represented in a mapping of the data in a normalized rectangular form (as in FIG. 16), in other examples, the AOA estimation results from the FFT operation may be mapped to a non-uniform (e.g., polar) grid of the data. This is, in some examples, the 2D spatial frequency $$(u, v) = \left(\frac{d_x}{\lambda} \cos\phi \cos\theta, \frac{d_z}{\lambda} \sin\phi\right)$$

polar samples may be mapped from the 2D-FFT uniform rectangular normalized spatial frequency samples $$\left(\frac{k}{M}, \frac{l}{N}\right)$$

via interpolation. Differences in the visualization of the data is shown with reference to FIGS. 17 and 18. In particular, FIG. 17 is a generic graph representing the 2D-FFT normalized (e.g., uniform rectangular) spatial frequency sampling points, while FIG. 18 is a generic graph representing the angular (degree) sampling points in a nonuniform (e.g., polar) grid corresponding to the same sampling points represented in the graph of FIG. 17. A specific example of a polar grid representation of AOA estimation values is shown in FIGS. 19 and 20. In particular, FIG. 19 is a polar grid visualization of the angular response corresponding to the three point moving target simulation defined by Table 3. That is, FIG. 19 represents the same information as represented in FIG. 16 except that FIG. 19 is represented in a nonuniform plot, whereas FIG. 16 is represented in a normalized (uniform) plot. FIG. 20 is a zoomed in view of Target 1 represented in the polar grid shown in FIG. 19. As shown in FIG. 20, the individual angular bins are nonuniform and nonrectangular.

Figure 21:
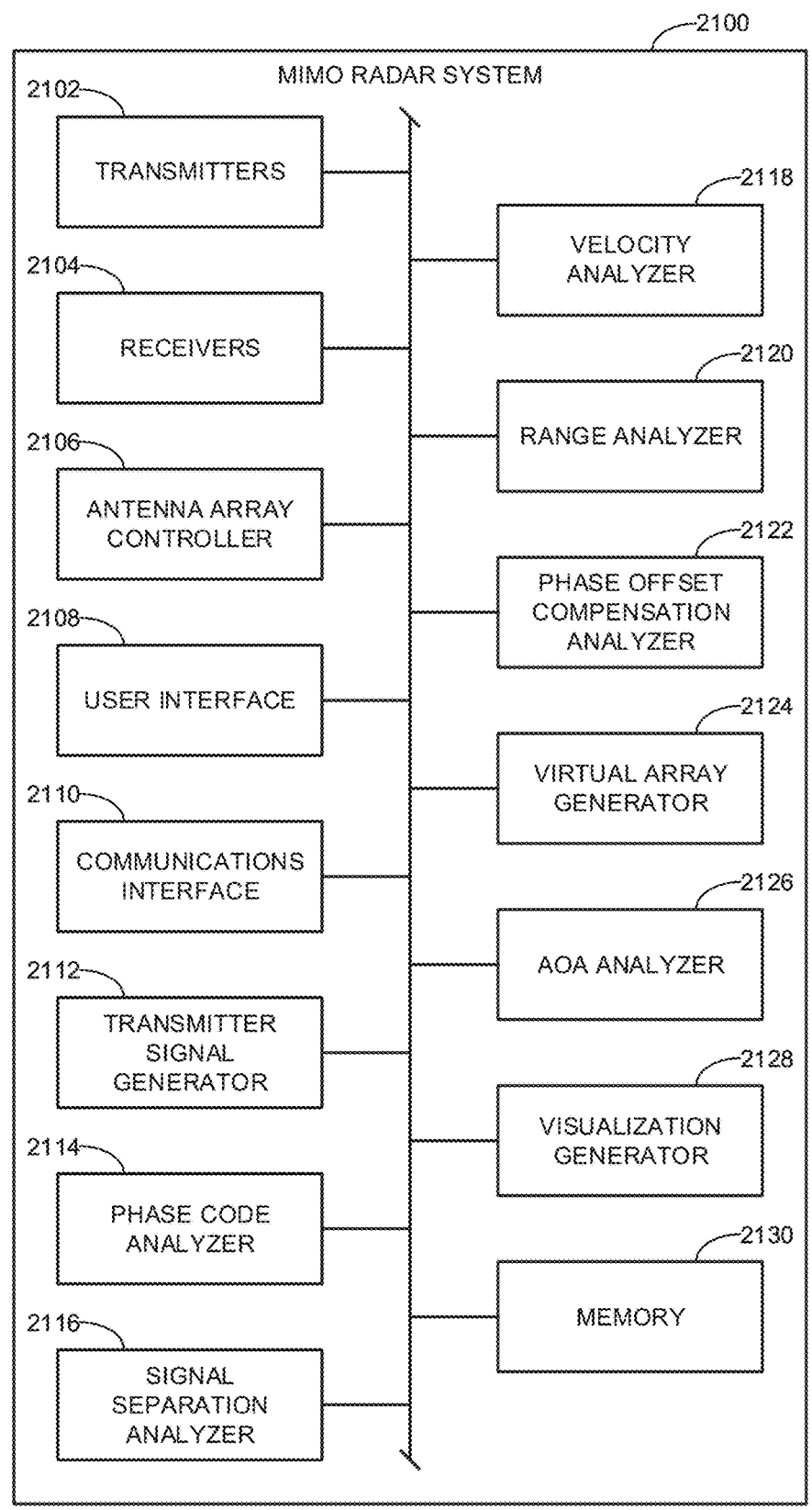
FIG. 21 is an example MIMO radar system constructed in accordance with teachings disclosed herein.

FIG. 21 is an example MIMO radar system 2100 constructed in accordance with teachings disclosed herein. As shown in the illustrated example, the radar system 2100 includes any suitable number of transmitters 2102 and any suitable number of receivers 2104 arranged in any suitable manner in an antenna array. The example radar system 2100 further includes an example antenna array controller 2106, an example user interface 2108, an example communications interface 2110, an example transmitter signal generator 2112, an example phase code analyzer 2114, an example signal separation analyzer 2116, an example velocity analyzer 2118, an example range analyzer 2120, an example phase offset compensation analyzer 2122, an example virtual array generator 2124, an example angle of arrival (AOA) analyzer 2126, an example visualization generator 2128, an example memory 2130.

The example radar system 2100 of FIG. 21 includes the example antenna array controller 2106 to facilitate and/or control the operation of the transmitters and/or receivers. For example, the antenna array controller 2106 may cause the transmitters to transmit appropriate signals as generated by the radar system and to handle the initial processing of signals received by the separate receivers 2104. Further, the antenna array controller 2106 serves as an interface to enable interactions between the antenna array (e.g., including the transmitters 2102 and the receivers 2104) and other components of the radar system 2100. Although a single antenna array controller 2106 is represented in FIG. 21, in some examples, the transmitters 2102 may be associated with a first antenna array controller 2106 and the receivers 2104 may be associated with a second antenna array controller 2106. In other examples, each transmitter 2102 and/or each receiver 2104 may be associated with an individual controller.

The example radar system 2100 of FIG. 21 includes the example user interface 2108 to enable a user to input and/or configure parameters defining the operation of the radar system. That is, in some examples, a user may provide relevant design specifications (e.g., maximum range, maximum unambiguous velocity, range resolution, velocity resolution, etc.) that serve as the basis to define the particular nature of the waveform for the chirps transmitted by the different transmitters. In some examples, the radar design specifications and corresponding transmitter signal waveform parameters are stored in the example memory 2130. Additionally, in some examples, the user interface 2108 provides the results of the analysis of signals received at the different receivers 2104 indicative of the different dimensions measured by the radar system for detected targets (e.g., range, velocity, elevation, and azimuth). In some examples, the user interface 2108 may be omitted. In some such examples, user inputs are received from a separate system via the example communications interface 2110. Likewise, the communications interface 2110 may provide the results of the analysis of the signals received at the receivers 2104 for display to a user via the separate system. In some examples, the separate system may be local to the example MIMO radar system 2100. In other examples, the separate system may be remote from the radar system 2100 but in communication with the radar system 2100 via the communications interface 2110 via a network.

The example radar system 2100 of FIG. 21 includes the example transmitter signal generator 2112 to define and generate individual chirps to be transmitted by individual ones of the transmitters 2102. Further, in some examples, the transmitter signal generator 2112 defines how different ones of the chirps are to be combined to form a full chirp cycle. In some examples, the different chirps are separated by a time delay ($\tau_{tdm}$) associated with the compact TDM waveform defined in Equation 14. In some examples, the different chirps are separated by a frequency offset ($\Delta f$) associated with the compact FDM waveform defined in Equation 19. In some examples, the individual chirps, a complete chirp cycle, and/or a combined series chirp cycles within a circular chirp cycle radar frame are generated in advance and stored in the memory 2130 prior to being transmitted by the transmitters 2102.

The example radar system 2100 of FIG. 21 includes the example phase code analyzer 2114 to enable slow time phase scrambling of the individual chirps generated by the example transmitter signal generator 2112. Further, in some examples, the phase code analyzer 2114 analyzes echo signals received at the receivers to descramble the signals based on the conjugate of the scrambling code applied at the time the signal was transmitted by a transmitter 2102.

The example radar system 2100 of FIG. 21 includes the example signal separation analyzer 2116 to analyze different echo signals received by the receivers to distinguish or separate the signals based on their source of origin. That is, in some examples, the signal separation analyzer 2116 identifies the transmitter corresponding to each echo signal received so that the echo signals can be associated with the correct transmitter for subsequent analysis. In some examples, separation of the echo signals is based on applying a matched filter to the echo signals. Additionally or alternatively, in some examples, the signal separation analyzer 2116 performs a digital dechirp process to separate different echo signals to be associated with corresponding transmitters.

The example radar system 2100 of FIG. 21 includes the example velocity analyzer 2118 to determine the Doppler rate (e.g., radial velocity) and Doppler motion phase values corresponding to different targets reflecting the echo signals received by the receivers 2104. In some examples, the Doppler motion phase values are based on a FFT analysis of the received signals along the Doppler dimension.

The example radar system 2100 of FIG. 21 includes the example range analyzer 2120 to determine the range of targets detected based on the echo signals received by the receivers 2104. In some examples, the range of targets is determined based on a cross-correlation analysis of the received echo signals relative to the corresponding transmitter chirps.

The example radar system 2100 of FIG. 21 includes the example phase offset compensation analyzer 2122 to correct for phase offset due to motion (for compact TDM implementations) and range (for compact FDM implementations). In some examples, the phase offset values (for range of Doppler motion) may be calculated prior to subsequent analysis of received signals. In some such examples, the phase offset values are stored in the example memory 2130.

The example radar system 2100 of FIG. 21 includes the example virtual array generator 2124 to generate a virtual MIMO array matrix corresponding to a virtual uniform rectangular array. That is, in some examples, the virtual array generator 2124 generates a virtual array matrix with the values of the received signals associated with each transmitter-receiver pair arranged as if the transmitters 2102 and receivers 2104 were configured in a uniform rectangular array.

The example radar system 2100 of FIG. 21 includes the example angle of arrival (AOA) analyzer 2126 to calculate the angle of arrive (e.g., the azimuth and elevation) of targets detected by the receivers. In some examples, the AOA analyzer 2126 calculates the AOA based on an FFT analysis of the virtual array matrix generated by the virtual array generator 2124.

The example radar system 2100 of FIG. 21 includes the example visualization generator 2128 to generate visualizations indicative of the outputs of one or more of the example velocity analyzer 2118, the example range analyzer 2120, and the example AOA analyzer 2126. More particularly, in some examples, the visualization generator 2128 generates plots or maps of the range and Doppler motion indicated by an analysis of the received echo signals. In some examples, the visualization generator 2128 generates plots or maps of AOA estimation values in a normalized (uniform) grid. In some examples, the visualization generator 2128 generates plots or maps of AOA estimation values in a nonuniform (polar) grid. The visualizations of the visualization generator 2128 may be provided to the user interface 2108 and/or the communications interface 2110 to be provided to a user for viewing.

While an example manner of implementing the example radar system 2100 of FIG. 21 is illustrated in FIG. 21, one or more of the elements, processes and/or devices illustrated in FIG. 21 may be combined, divided, re-arranged, omitted, eliminated and/or implemented in any other way. Further, the example transmitters 2102, the example receivers 2104, the example antenna array controller 2106, the example user interface 2108, the example communications interface 2110, the example transmitter signal generator 2112, the example phase code analyzer 2114, the example signal separation analyzer 2116, the example velocity analyzer 2118, the example range analyzer 2120, the example phase offset compensation analyzer 2122, the example virtual array generator 2124, the example angle of arrival (AOA) analyzer 2126, the example visualization generator 2128, the example memory 2130, and/or, more generally, the example radar system 2100 of FIG. 21 may be implemented by hardware, software, firmware and/or any combination of hardware, software and/or firmware. Thus, for example, any of the example transmitters 2102, the example receivers 2104, the example antenna array controller 2106, the example user interface 2108, the example communications interface 2110, the example transmitter signal generator 2112, the example phase code analyzer 2114, the example signal separation analyzer 2116, the example velocity analyzer 2118, the example range analyzer 2120, the example phase offset compensation analyzer 2122, the example virtual array generator 2124, the example angle of arrival (AOA) analyzer 2126, the example visualization generator 2128, the example memory 2130 and/or, more generally, the example radar system 2100 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example transmitters 2102, the example receivers 2104, the example antenna array controller 2106, the example user interface 2108, the example communications interface 2110, the example transmitter signal generator 2112, the example phase code analyzer 2114, the example signal separation analyzer 2116, the example velocity analyzer 2118, the example range analyzer 2120, the example phase offset compensation analyzer 2122, the example virtual array generator 2124, the example angle of arrival (AOA) analyzer 2126, the example visualization generator 2128, and/or the example memory 2130 is/are hereby expressly defined to include a non-transitory computer readable storage device or storage disk such as a memory, a digital versatile disk (DVD), a compact disk (CD), a Blu-ray disk, etc. including the software and/or firmware. Further still, the example radar system 2100 of FIG. 21 may include one or more elements, processes and/or devices in addition to, or instead of, those illustrated in FIG. 21, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Flowcharts representative of example hardware logic, machine readable instructions, hardware implemented state machines, and/or any combination thereof for implementing the radar system 2100 of FIG. 21 is shown in FIGS. 22-26. The machine readable instructions may be one or more executable programs or portion(s) of an executable program for execution by a computer processor such as the processor 2712 shown in the example processor platform 2700 discussed below in connection with FIG. 27. The program may be embodied in software stored on a non-transitory computer readable storage medium such as a CD-ROM, a floppy disk, a hard drive, a DVD, a Blu-ray disk, or a memory associated with the processor 2712, but the entire program and/or parts thereof could alternatively be executed by a device other than the processor 2712 and/or embodied in firmware or dedicated hardware. Further, although the example program is described with reference to the flowchart illustrated in FIG. 21, many other methods of implementing the example radar system 2100 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 22-26 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Figure 22:
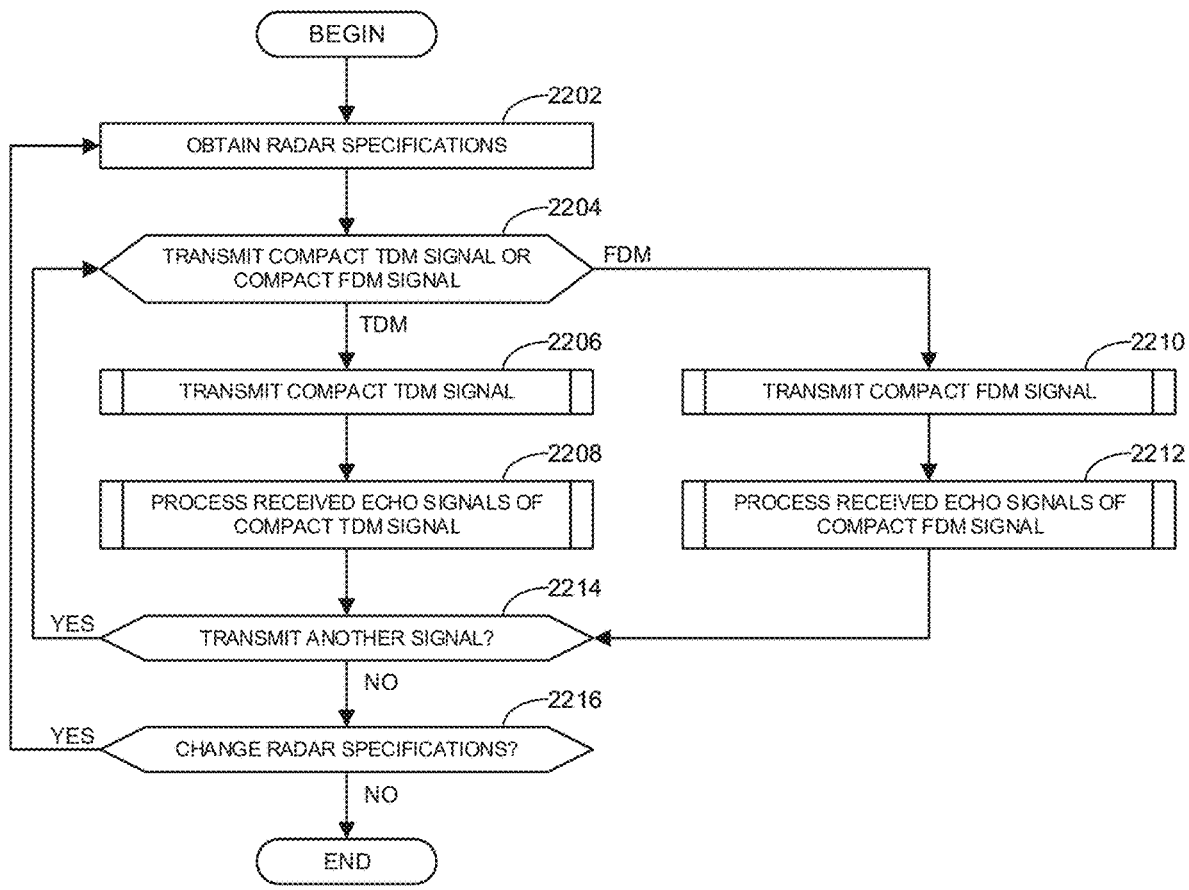
FIGS. 22-26 are flowcharts representative of machine readable instructions which may be executed to implement the example radar system of FIG. 21.

The program of FIG. 22 begins at block 2202 where the example user interface 2108 and/or the example communications interface 2110 obtains radar specifications. Radar specifications may include the maximum range for the radar system 2100, the maximum unambiguous velocity, the range resolution, and the velocity resolution. At block 2204, the example transmitter signal generator 2112 determines whether to transmit a compact time-division multiplexing (TDM) signal or a compact frequency-divisional multiplexing (FDM) signal. In some examples, this determination is made based on user inputs provided along with the radar specifications obtained at block 2202.

If the radar system 2100 is to transmit a compact TDM signal, control advances to block 2206 where the example radar system 2100 transmits a compact TDM signal. Further detail regarding the implementation of block 2206 is provided below in connection with FIG. 23. Thereafter, control advances to block 2208 where the example radar system 2100 processes received echo signals of the compact TDM signal. Further detail regarding the implementation of block 2208 is provided below in connection with FIG. 25. Thereafter, control advances to block 2214.

Returning to block 2204, the radar system 2100 is to transmit a compact FDM signal, control advances to block 2210 where the example radar system 2100 transmits a compact FDM signal. Further detail regarding the implementation of block 2210 is provided below in connection with FIG. 24. Thereafter, control advances to block 2212 where the example radar system 2100 processes received echo signals of the compact FDM signal. Further detail regarding the implementation of block 2212 is provided below in connection with FIG. 25. Thereafter, control advances to block 2214.

At block 2214, the example radar system 2100 determines whether to transmit another signal. If so, control returns to block 2204. Otherwise, control advances to block 2216 where the example radar system 2100 determines whether to change the radar specifications. If so, control returns to block 2202. Otherwise, the example process of FIG. 22 ends.

Figure 23:
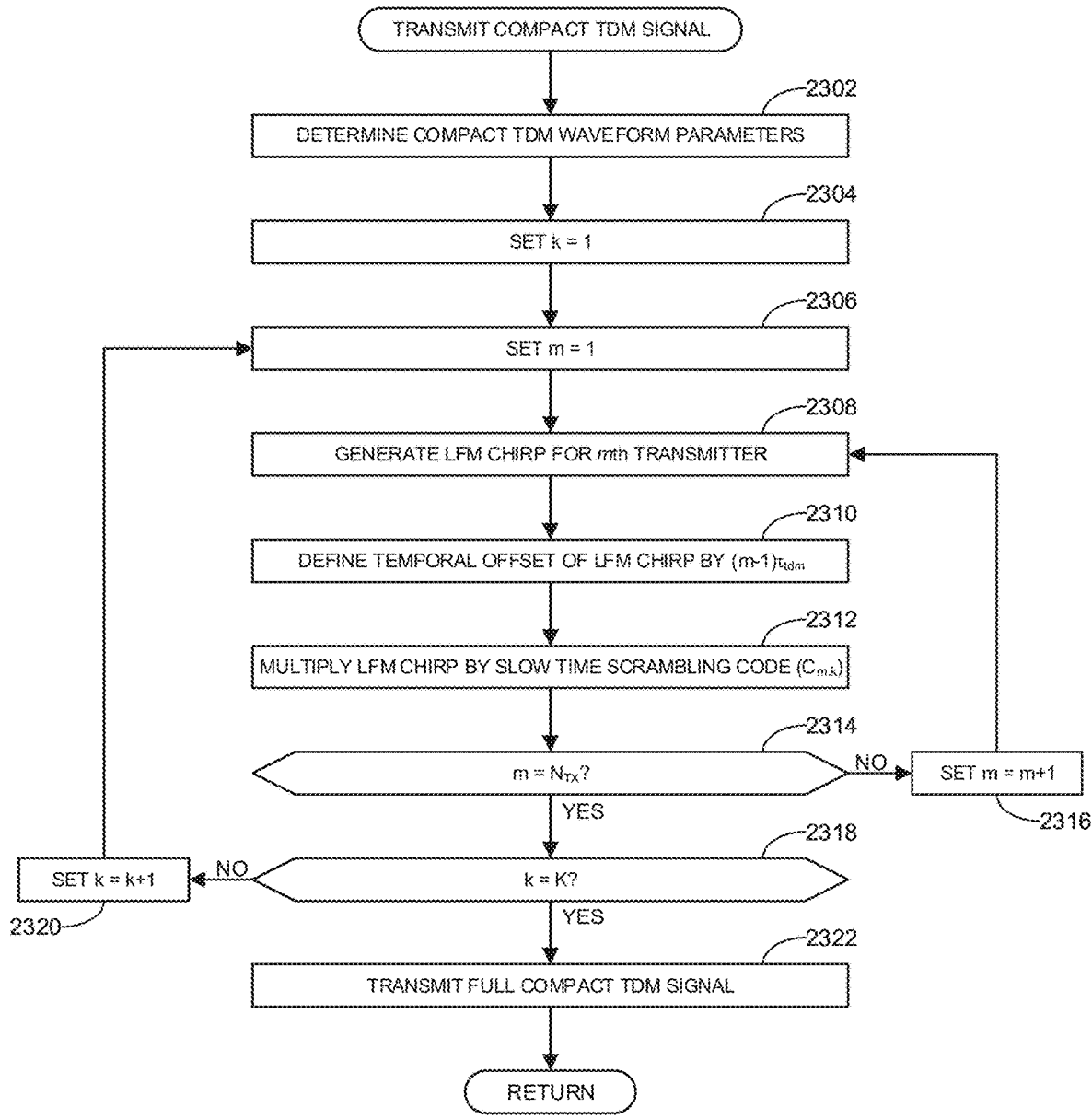

FIG. 23 is a flowchart representative of an example implementation of block 2206 of FIG. 22 corresponding to the transmission of a compact TDM signal. The example process of FIG. 23 begins at block 2302 where the example transmitter signal generator 2112 determines the compact TDM waveform parameters. In some examples, the compact TDM waveform is defined by Equation 14. Accordingly, in some examples, the compact TDM waveform parameters include the center frequency of the signal to be transmitted ($f_0$), the bandwidth of the signal (B), the chirp duration ($T_c$), the pulse repetition interval (PRI), the time offset or delay between separate transmitter chirps ($\tau_{tdm}$), and the total number of transmitters ($N_{TX}$). In some examples, these parameters are determined based on the radar specifications obtained at block 2102 of FIG. 21 and/or based on known characteristics of the radar system 2100 such as the number of transmitters and receivers and their physical arrangement.

At block 2304, the example transmitter signal generator 2112 sets parameter k to a value of 1. The parameter k serves as a counter to keep track of the number of separate chirp cycles stitched together to form a full circular chirp cycle as shown and described above in connection with FIG. 8. At block 2306, the example transmitter signal generator 2112 sets parameter m to a value of 1. The parameter m serves as a counter to keep track of the different transmitters for which individual chirps are defined within a chirp cycle. At block 2308, the example transmitter signal generator 2112 generates a linear frequency-modulated (LFM) chirp for the mth transmitter. In some examples, the transmitter signal generator 2112 generates the chirp in conjunction with a window function to reduce out of band emissions and the resulting desensitization to far targets caused by imperfections in the receiver chain. At block 2310, the example transmitter signal generator 2112 defines the temporal offset of the LFM chirp by $(m-1)\tau_{tdm}$. At block 2312, the example phase code analyzer 2114 multiplies the LFM chirp by a slow time scrambling code ($c_{m,k}$). In some examples, the phase code scrambling is implemented in accordance with Equations 26-29 described above.

At block 2314, the example transmitter signal generator 2112 determines whether $m=N_{TX}$. That is, the example transmitter signal generator 2112 determines whether a chirp has been generated for each transmitter in the radar system 2100. If not, m is incremented by 1 (block 2316) and control returns to block 2308. If $m=N_{TX}$, control advances to block 2318 where the example transmitter signal generator 2112 determines whether k=K. That is, the example transmitter signal generator 2112 determines whether all chirp cycles for the full circular chirp cycle have been generated. If not, k is incremented by 1 (block 2320) and control returns to block 2306. If k=K, then control advances to block 2322, where the transmitters 2102 transmit the full compact TDM signal. Thereafter, the example process of FIG. 23 ends and returns to complete the process of FIG. 22.

In some examples, the generation of chirps for a single chirp cycle (e.g., blocks 2308-2316) are performed once and then the resulting chirp cycle is stored in the example memory 2130 for subsequent use. Further, in some examples, the generation of a full circular chirp cycle containing multiple individual chirp cycles (e.g., blocks 2306-2320) may be implemented once and then stored in the example memory 2130 for subsequent use. That is, in some examples, the full process of FIG. 23 need not be implemented. Rather, once the full compact TDM signal has been generated, it can simply be transmitted as many times as necessary without going through the full generation process each time.

Figure 24:
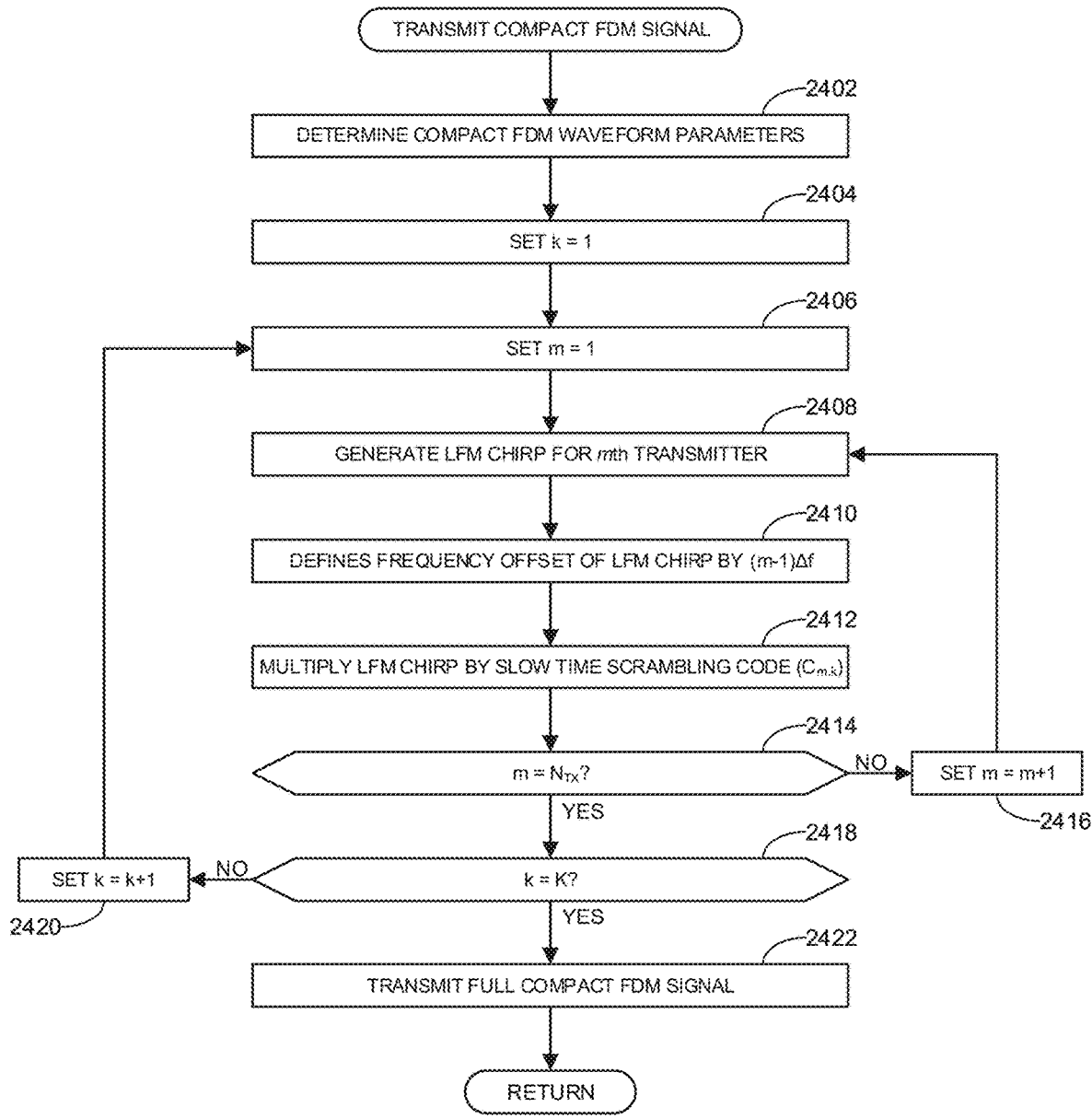

FIG. 24 is a flowchart representative of an example implementation of block 2210 of FIG. 22 corresponding to the transmission of a compact FDM signal. The example process of FIG. 24 begins at block 2402 where the example transmitter signal generator 2112 determines the compact TDM waveform parameters. In some examples, the compact TDM waveform is defined by Equation 19. Accordingly, in some examples, the compact TDM waveform parameters include the center frequency of the signal to be transmitted ($f_0$), the bandwidth of the signal (B), the chirp duration ($T_c$), the pulse repetition interval (PRI), the frequency offset between separate transmitter chirps ($\Delta f$), and the total number of transmitters ($N_{TX}$). In some examples, these parameters are determined based on the radar specifications obtained at block 2102 of FIG. 21 and/or based on known characteristics of the radar system 2100 such as the number of transmitters and receivers and their physical arrangement.

Blocks 2404, 2406, and 2408 of FIG. 24 are identical to blocks 2304, 2306, and 2308 described above in connection with FIG. 23 except that the LFM chirp generated at block 2408 of FIG. 24 is based on the waveform defined in Equation 19 (rather than Equation 14 in the case of block 2308 of FIG. 23). At block 2410, the example transmitter signal generator 2112 defines the frequency offset of the LFM chirp by $(m-1)\Delta f$. At block 2412, the example phase code analyzer 2114 multiplies the LFM chirp by a slow time scrambling code ($c_{m,k}$). In some examples, block 2412 may be omitted for the compact FDM implement because the scrambling code is used to mitigate against phantom targets that are primarily a concern for TDM based radar schemes.

Blocks 2414, 2416, 2418, and 2420 of FIG. 24 are identical to blocks 2314, 2316, 2318, and 2320 described above in connection with FIG. 23. At block 2422 the transmitters 2102 transmits the full compact FDM signal. Thereafter, the example process of FIG. 24 ends and returns to complete the process of FIG. 22. As with FIG. 23, in some examples, the generation of chirps for a single chirp cycle (e.g., blocks 2408-2416) and/or the generation of a full circular chirp cycle of multiple individual chirps (e.g., blocks 2406-2420) is performed once and then the resulting chirp cycle and/or full circular chirp cycle is stored in the example memory 2130 for subsequent use.

Figure 25:
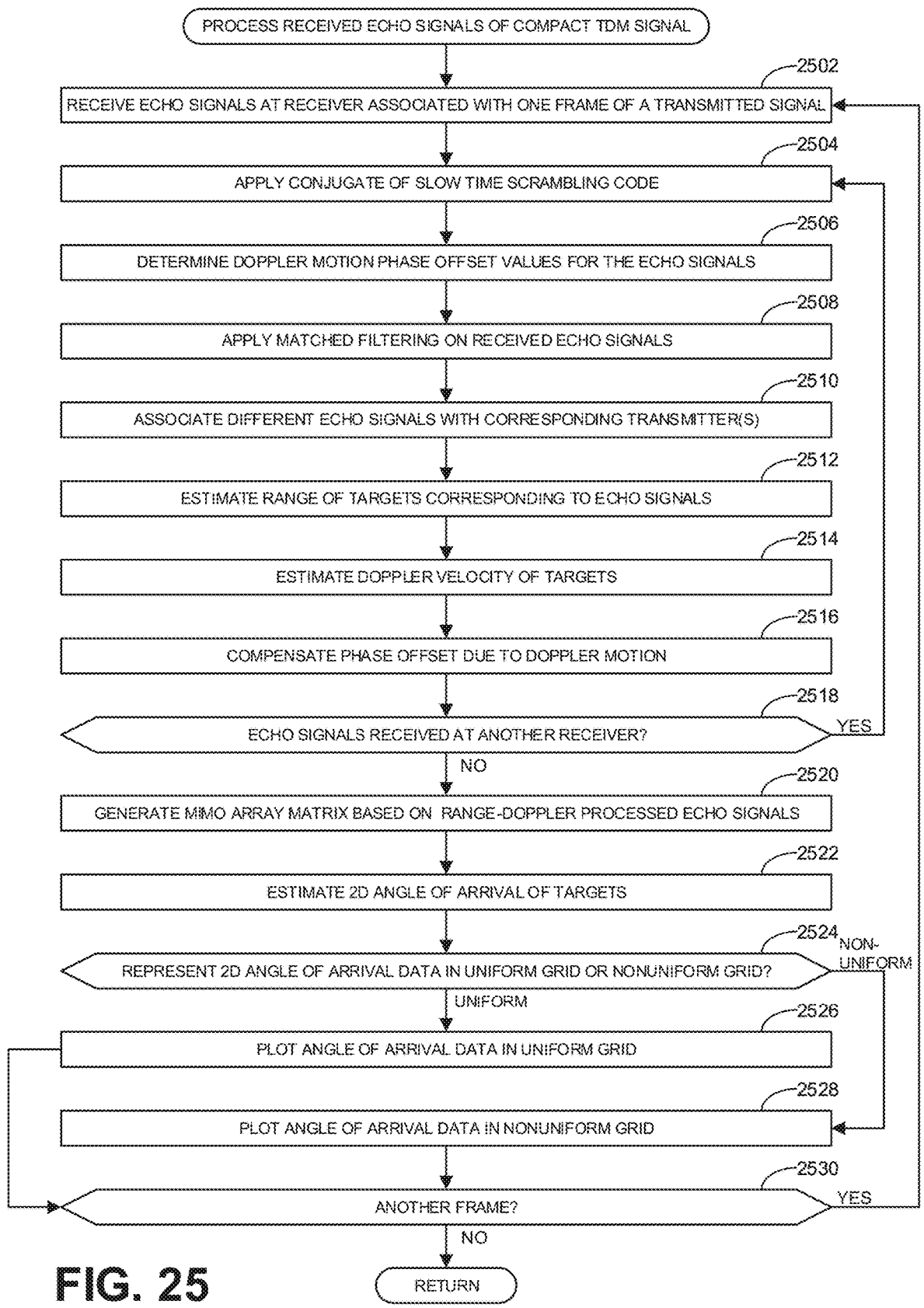

FIG. 25 is a flowchart representative of an example implementation of block 2208 of FIG. 22 corresponding to the processing of received echo signals of a compact TDM signal. The example process of FIG. 25 begins at block 2202 where one of the receivers 2104 receives echo signals associated with one frame of a transmitted signal. At block 2504, the example phase code analyzer applies the conjugate of the slow time scrambling code. At block 2506, the example phase offset compensation analyzer determines the Doppler motion phase offset values for the echo signals. At block 2508, the example signal separation analyzer 2116 applies matched filtering on the received echo signals. At block 2510, the example signal separation analyzer 2116 associates different echo signals with corresponding transmitter(s). At block 2512, the example range analyzer 2120 estimates the range of targets corresponding to the echo signals. At block 2514, the example velocity analyzer 2118, estimates the Doppler velocity of the targets. At block 2516, the example phase offset compensation analyzer 2122 compensates the phase offset due to Doppler motion. At block 2518, the example radar system 2100 determines whether echo signals were received at another receiver. If so, control returns to block 2504. Otherwise, control advances to block 2520.

At block 2520, the example virtual array generator 2124 generates a MIMO array matrix based on the range-Doppler processed echo signals. In some examples, the array matrix is populated with the data to correspond to a virtual uniform rectangular array. At block 2522, the example AOA analyzer 2126 estimates the 2D angle of arrival of the targets. In some examples, the AOA estimation is based on the FFT analysis of the MIMO matrix array generated by the virtual array generator 2124 as described above in connection with Equations 36-41. At block 2524, the example visualization generator 2128 determines whether to represent the 2D angle of arrival data in a uniform grid or a nonuniform grid. If the data is to be represented in a uniform grid, control advances to block 2526 where the example visualization generator 2128 plots the angle of arrival data in a uniform grid. Thereafter, control advances to block 2530. If the example visualization generator 2128 determines to represent the 2D angle of arrival data in a nonuniform grid, control advances to block 2528 where the example visualization generator 2128 plots the angle of arrival data in a nonuniform grid. In some examples, the nonuniform grid is a polar grid. Thereafter, control advances to block 2530. At block 2530, the example radar system 2100 determines whether there is another frame. If so, control returns to block 2502. Otherwise, the example process of FIG. 25 ends and returns to complete the process of FIG. 22.

Figure 26:
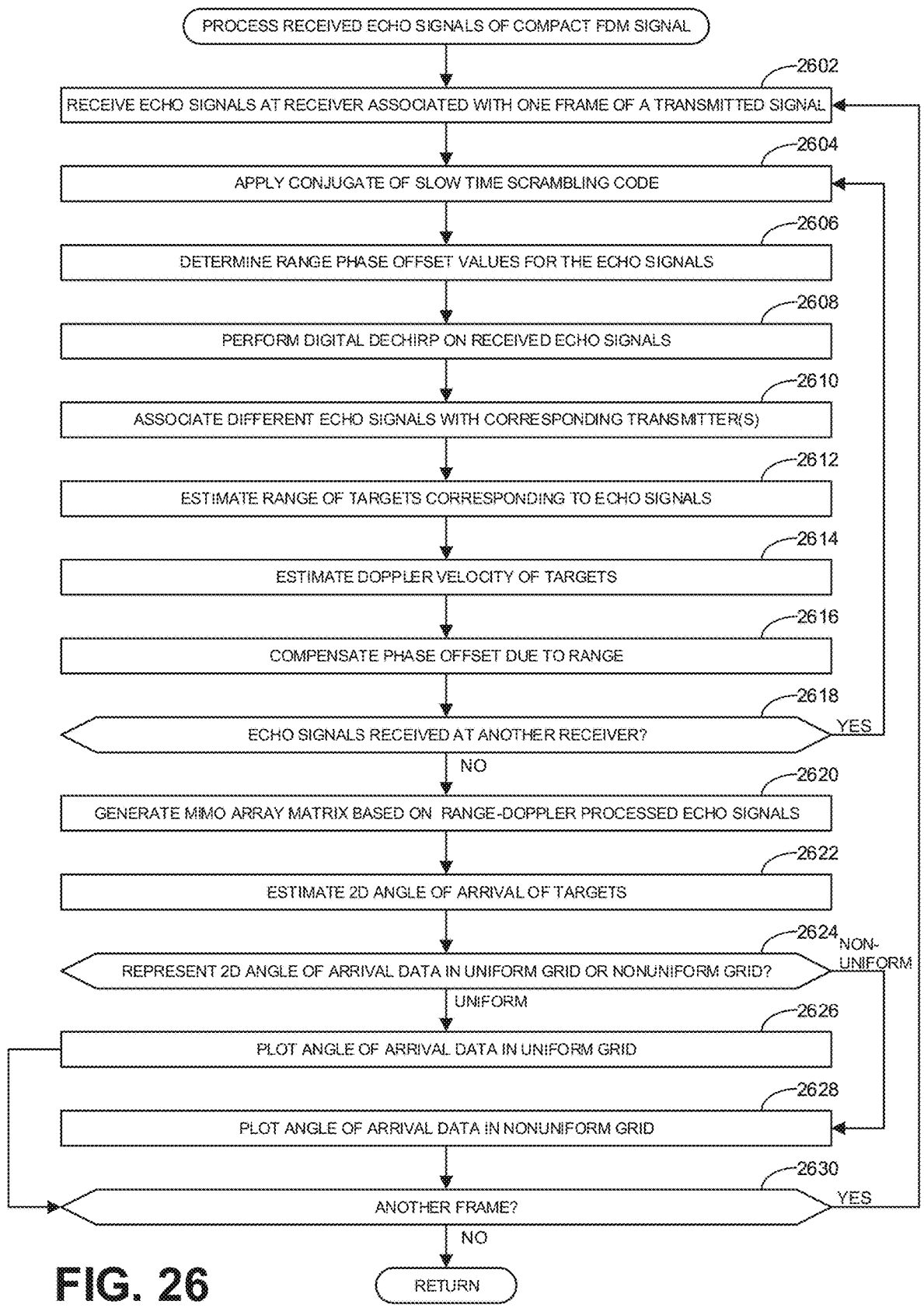

FIG. 26 is a flowchart representative of an example implementation of block 2212 of FIG. 22 corresponding to the processing of received echo signals of a compact FDM signal. Blocks 2602 and 2604 of FIG. 25 are identical to blocks 2502 and 2504 described above in connection with FIG. 25. At block 2606, the example phase offset compensation analyzer determines the range phase offset values for the echo signals. At block 2608, the example signal separation analyzer 2116 performs a digital dechirp process on the received echo signals. Thereafter, blocks 2610, 2612, and 2614 of FIG. 25 are implemented in the same manner as blocks 2510, 2512, and 2514 described above in connection with FIG. 25.

At block 2616, the example phase offset compensation analyzer 2122 compensates the phase offset due to range. Thereafter, blocks 2618-2530 of FIG. 26 are implemented in the same manner as blocks 2518-2530 described above in connection with FIG. 25. Thereafter, the example process of FIG. 26 ends and returns to complete the process of FIG. 22.

Figure 27:
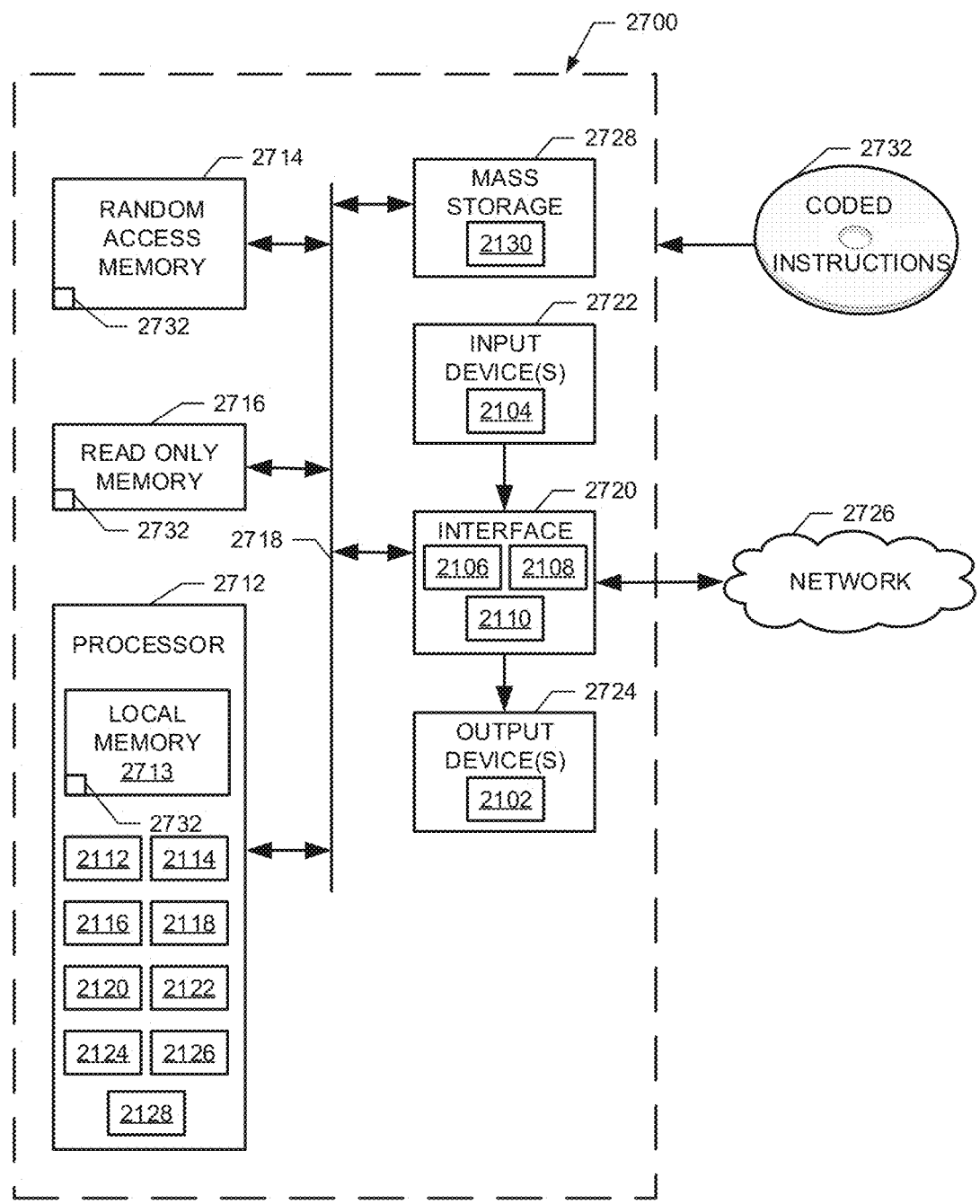
FIG. 27 is a block diagram of an example processing platform structured to execute the instructions of FIGS. 22-26 to implement the example radar system of FIG. 21.

FIG. 27 is a block diagram of an example processor platform 2700 structured to execute the instructions of FIGS. 22-26 to implement the radar system 2100 of FIG. 21. The processor platform 2700 can be, for example, a server, a personal computer, a workstation, a self-learning machine (e.g., a neural network), or any other type of computing device.

The processor platform 2700 of the illustrated example includes a processor 2712. The processor 2712 of the illustrated example is hardware. For example, the processor 2712 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example transmitter signal generator 2112, the example phase code analyzer 2114, the example signal separation analyzer 2116, the example velocity analyzer 2118, the example range analyzer 2120, the example phase offset compensation analyzer 2122, the example virtual array generator 2124, the example angle of arrival (AOA) analyzer 2126, and the example visualization generator 2128.

The processor 2712 of the illustrated example includes a local memory 2713 (e.g., a cache). The processor 2712 of the illustrated example is in communication with a main memory including a volatile memory 2714 and a non-volatile memory 2716 via a bus 2718. The volatile memory 2714 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 2716 may be implemented by flash memory and/or any other desired type of memory device. Access to the main memory 2714, 2716 is controlled by a memory controller.

The processor platform 2700 of the illustrated example also includes an interface circuit 2720. The interface circuit 2720 may be implemented by any type of interface standard, such as an Ethernet interface, a universal serial bus (USB), a Bluetooth® interface, a near field communication (NFC) interface, and/or a PCI express interface. In this example, the interface circuit 2720 includes the example antenna array controller 2106, the example user interface 2108, and the example communications interface 2110.

In the illustrated example, one or more input devices 2722 are connected to the interface circuit 2720. The input device(s) 2722 permit(s) a user to enter data and/or commands into the processor 2712. The input device(s) can be implemented by, for example, an audio sensor, a microphone, a camera (still or video), a keyboard, a button, a mouse, a touchscreen, a track-pad, a trackball, isopoint and/or a voice recognition system. In this example, the input devices 2722 include the example receivers 2104.

One or more output devices 2724 are also connected to the interface circuit 2720 of the illustrated example. The output devices 2724 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 2720 of the illustrated example, thus, typically includes a graphics driver card, a graphics driver chip and/or a graphics driver processor. In this example, the output devices 2724 include the example transmitters 2102.

The interface circuit 2720 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 2726. The communication can be via, for example, an Ethernet connection, a digital subscriber line (DSL) connection, a telephone line connection, a coaxial cable system, a satellite system, a line-of-site wireless system, a cellular telephone system, etc.

The processor platform 2700 of the illustrated example also includes one or more mass storage devices 2728 for storing software and/or data. Examples of such mass storage devices 2728 include floppy disk drives, hard drive disks, compact disk drives, Blu-ray disk drives, redundant array of independent disks (RAID) systems, and digital versatile disk (DVD) drives. In this example, the mass storage device 2728 implements the example memory 2130

The machine executable instructions 2732 of FIGS. 22-26 may be stored in the mass storage device 2728, in the volatile memory 2714, in the non-volatile memory 2716, and/or on a removable non-transitory computer readable storage medium such as a CD or DVD.

From the foregoing, it will be appreciated that example methods, apparatus and articles of manufacture have been disclosed that enable MIMO radar transmissions that are much for efficient in terms of temporal and/or frequency resources than radar systems implemented based on conventional TDM or FDM schemes. More particularly, examples radar transmissions are based on waveforms that are compact such that different chirps from different transmitters overlap in both the time domain and the frequency domain. However, the waveform is defined such that the different signals remain separable (e.g., orthogonal) to enable subsequent processing to determine different characteristics (e.g., range, velocity, azimuth, and elevation) of detected objects with relative high accuracy. Further, the example waveforms are defined to enable flexibility in radar system designs based on tradeoffs between different parameters including maximum range, maximum unambiguous velocity, range resolution, and velocity resolution.

Example methods, apparatus, systems, and articles of manufacture to implement compact time-frequency division multiplexing for MIMO radar are disclosed herein. Further examples and combinations thereof include the following:

Example 1 includes an apparatus comprising an antenna array controller to transmit a first signal via a first transmitter of a radar antenna array, the first signal having a first duration and modulated across a first frequency range, transmit a second signal via a second transmitter of the radar antenna array, the second signal having a second duration and modulated across a second frequency range, the first and second durations including an overlapping period of time, the first and second frequency ranges including an overlapping frequency range, and a signal separation analyzer to determine a first echo received at a receiver of the radar antenna array corresponds to the first signal, the first echo produced by the first signal reflecting off an object, and determine a second echo received at the receiver corresponds to the second signal, the second echo produced by the second signal reflecting off the object.

Example 2 includes the apparatus of example 1, further including at least one of an angle of arrival analyzer to determine an elevation and azimuth of the object, a range analyzer to determine a range of the object, or a velocity analyzer to determine a velocity of the object.

Example 3 includes the apparatus of example 1, wherein the first and second signals are to be modulated across the respective first and second frequency ranges at a same linear rate of change.

Example 4 includes the apparatus of example 1, wherein the radar antenna array includes a plurality of transmitters to transmit a plurality of signals, the plurality of transmitters including the first and second transmitters and the plurality of signals including the first and second signals, a waveform of the plurality of signals to enable a maximum unambiguous velocity detectable by the radar antenna array to remain substantially constant for different numbers of transmitters in the plurality of transmitters.

Example 5 includes the apparatus of example 1, further including a transmitter signal generator to define a time delay between initiation of the transmission of the first signal and initiation of the transmission of the second signal, the time delay being shorter than the first duration and shorter than the second duration.

Example 6 includes the apparatus of example 5, wherein the time delay corresponds to the first duration divided by a total number of transmitters in the radar antenna array.

Example 7 includes the apparatus of example 1, wherein the antenna array controller is to transmit the first and second signals during a first chirp cycle, the second duration of the second signal to extend beyond an end of the first chirp cycle, and transmit third and fourth signals during a second chirp cycle following the first chirp cycle, the third signal corresponding to a second instance of the first signal transmitted from the first transmitter, the fourth signal corresponding to a second instance of the second signal from the second transmitter, a beginning of the second chirp cycle corresponding to the end of the first chirp cycle such that an ending of the second signal occurs during the second chirp cycle.

Example 8 includes the apparatus of example 7, further including a transmitter signal generator to stitch the first and second chirp cycles together in a baseband prior to processing the first, second, third, and fourth signals for transmission.

Example 9 includes the apparatus of example 1, wherein the antenna array controller is to initiate the transmission of the first and second signals at a same time, the first signal beginning at a first frequency and the second signal beginning at a second frequency, the first frequency separated from the second frequency by a frequency offset value, the frequency offset value being smaller than the first frequency range and smaller than the second frequency range.

Example 10 includes the apparatus of example 9, wherein the frequency offset value corresponds to the first frequency range divided by a total number of transmitters in the radar antenna array.

Example 11 includes the apparatus of example 1, further including a transmitter signal generator to generate the first and second signals based on a window function.

Example 12 includes the apparatus of example 1, further including a phase code analyzer to multiply the first signal by a first scrambling phase code before transmission of the first signal, multiply the second signal by a second scrambling phase code before transmission of the second signal, multiply a third scrambling phase code to the first echo, the third scrambling phase code being the conjugate of the first scrambling phase code, and multiply a fourth scrambling phase code to the second echo, the fourth scrambling phase code being the conjugate of the second scrambling phase code.

Example 13 includes the apparatus of example 1, further including a virtual array generator to generate a virtual array matrix based on range and velocity values calculated from an analysis of the first and second echoes, the virtual array matrix arranging the range and velocity values according to a virtual uniform rectangular antenna array, and an angle of arrival analyzer to estimate angle of arrival information associated with the object based on a fast Fourier transform analysis of the virtual array matrix.

Example 14 includes the apparatus of example 13, further including a visualization generator to generate a nonuniform mapping of the angle of arrival information.

Example 15 includes the apparatus of example 14, wherein the nonuniform mapping corresponds to a polar grid.

Example 16 includes a non-transitory computer readable medium comprising instructions that, when executed, cause a machine to at least transmit a first signal from a first transmitter of a radar antenna array, the first signal having a first duration and modulated across a first frequency range, transmit a second signal from a second transmitter of the radar antenna array, the second signal having a second duration and modulated across a second frequency range, the first and second durations including an overlapping period of time, the first and second frequency ranges including an overlapping frequency range, determine a first echo received at a receiver of the radar antenna array corresponds to the first signal, the first echo produced by the first signal reflecting off an object, and determine a second echo received at the receiver corresponds to the second signal, the second echo produced by the second signal reflecting off the object.

Example 17 includes the non-transitory computer readable medium of example 16, wherein the instructions further cause the machine to determine a characteristic of the object, the characteristic of the object corresponding to at least one of elevation, azimuth, range, or velocity.

Example 18 includes the non-transitory computer readable medium of example 16, wherein the first and second signals are to be modulated across the respective first and second frequency ranges at a same linear rate of change.

Example 19 includes the non-transitory computer readable medium of example 16, wherein the radar antenna array includes a plurality of transmitters to transmit a plurality of signals, the plurality of transmitters including the first and second transmitters and the plurality of signals including the first and second signals, a waveform of the plurality of signals to enable a maximum unambiguous velocity detectable by the radar antenna array to remain substantially constant for different numbers of transmitters in the plurality of transmitters.

Example 20 includes the non-transitory computer readable medium of example 16, wherein the instructions further cause the machine to initiate the transmission of the second signal a time delay after initiation of the transmission of the first signal, the time delay being shorter than the first duration and shorter than the second duration.

Example 21 includes the non-transitory computer readable medium of example 20, wherein the time delay corresponds to the first duration divided by a total number of transmitters in the radar antenna array.

Example 22 includes the non-transitory computer readable medium of example 16, wherein the instructions further cause the machine to transmit the first and second signals during a first chirp cycle, the second duration of the second signal to extend beyond an end of the first chirp cycle, and transmit third and fourth signals during a second chirp cycle following the first chirp cycle, the third signal corresponding to a second instance of the first signal transmitted from the first transmitter, the fourth signal corresponding to a second instance of the second signal from the second transmitter, a beginning of the second chirp cycle corresponding to the end of the first chirp cycle such that an ending of the second signal occurs during the second chirp cycle.

Example 23 includes the non-transitory computer readable medium of example 22, wherein the instructions further cause the machine to stitch the first and second chirp cycles together in a baseband prior to processing the first, second, third, and fourth signals for transmission.

Example 24 includes the non-transitory computer readable medium of example 16, wherein the instructions further cause the machine to initiate the transmission of the first and second signals at a same time, the first signal beginning at a first frequency and the second signal beginning at a second frequency, the first frequency separated from the second frequency by a frequency offset value, the frequency offset value being smaller than the first frequency range and smaller than the second frequency range.

Example 25 includes the non-transitory computer readable medium of example 24, wherein the frequency offset value corresponds to the first frequency range divided by a total number of transmitters in the radar antenna array.

Example 26 includes the non-transitory computer readable medium of example 16, wherein the instructions further cause the machine to generate the first and second signals based on a window function.

Example 27 includes the non-transitory computer readable medium of example 16, wherein the instructions further cause the machine to multiply the first signal by a first scrambling phase code before transmission of the first signal, multiply the second signal by a second scrambling phase code before transmission of the second signal, multiply a third scrambling phase code to the first echo, the third scrambling phase code being the conjugate of the first scrambling phase code, and multiply a fourth scrambling phase code to the second echo, the fourth scrambling phase code being the conjugate of the second scrambling phase code.

Example 28 includes the non-transitory computer readable medium of example 16, wherein the instructions further cause the machine to generate a virtual array matrix based on range and velocity values calculated from an analysis of the first and second echoes, the virtual array matrix arranging the range and velocity values according to a virtual uniform rectangular antenna array, and estimate angle of arrival information associated with the object based on a fast Fourier transform analysis of the virtual array matrix.

Example 29 includes the non-transitory computer readable medium of example 28, wherein the instructions further cause the machine to generate a nonuniform mapping of the angle of arrival information.

Example 30 includes the non-transitory computer readable medium of example 29, wherein the nonuniform mapping corresponds to a polar grid.

Example 31 includes a method of implementing a MIMO radar, the method comprising transmitting a first signal from a first transmitter of a radar antenna array, the first signal having a first duration and modulated across a first frequency range, transmitting a second signal from a second transmitter of the radar antenna array, the second signal having a second duration and modulated across a second frequency range, the first and second durations including an overlapping period of time, the first and second frequency ranges including an overlapping frequency range, determining a first echo received at a receiver of the radar antenna array corresponds to the first signal, the first echo produced by the first signal reflecting off an object, and determining a second echo received at the receiver corresponds to the second signal, the second echo produced by the second signal reflecting off the object.

Example 32 includes the method of example 31, further including determining a characteristic of the object, the characteristic of the object corresponding to at least one of elevation, azimuth, range, or velocity.

Example 33 includes the method of example 31, wherein the first and second signals are to be modulated across the respective first and second frequency ranges at a same linear rate of change.

Example 34 includes the method of example 31, wherein the radar antenna array includes a plurality of transmitters to transmit a plurality of signals, the plurality of transmitters including the first and second transmitters and the plurality of signals including the first and second signals, a waveform of the plurality of signals to enable a maximum unambiguous velocity detectable by the radar antenna array to remain substantially constant for different numbers of transmitters in the plurality of transmitters.

Example 35 includes the method of example 31, further including initiating the transmission of the second signal a time delay after initiation of the transmission of the first signal, the time delay being shorter than the first duration and shorter than the second duration.

Example 36 includes the method of example 35, wherein the time delay corresponds to the first duration divided by a total number of transmitters in the radar antenna array.

Example 37 includes the method of example 31, further including transmitting the first and second signals during a first chirp cycle, the second duration of the second signal to extend beyond an end of the first chirp cycle, and transmitting third and fourth signals during a second chirp cycle following the first chirp cycle, the third signal corresponding to a second instance of the first signal transmitted from the first transmitter, the fourth signal corresponding to a second instance of the second signal from the second transmitter, a beginning of the second chirp cycle corresponding to the end of the first chirp cycle such that an ending of the second signal occurs during the second chirp cycle.

Example 38 includes the method of example 37, further including stitching the first and second chirp cycles together in a baseband prior to processing the first, second, third, and fourth signals for transmission.

Example 39 includes the method of example 31, further including initiating the transmission of the first and second signals at a same time, the first signal beginning at a first frequency and the second signal beginning at a second frequency, the first frequency separated from the second frequency by a frequency offset value, the frequency offset value being smaller than the first frequency range and smaller than the second frequency range.

Example 40 includes the method of example 39, wherein the frequency offset value corresponds to the first frequency range divided by a total number of transmitters in the radar antenna array.

Example 41 includes the method of example 31, further including generating the first and second signals based on a window function.

Example 42 includes the method of example 31, further including multiplying the first signal by a first scrambling phase code before transmission of the first signal, multiplying the second signal by a second scrambling phase code before transmission of the second signal, multiplying a third scrambling phase code to the first echo, the third scrambling phase code being the conjugate of the first scrambling phase code, and multiplying a fourth scrambling phase code to the second echo, the fourth scrambling phase code being the conjugate of the second scrambling phase code.

Example 43 includes the method of example 31, further including generating a virtual array matrix based on range and velocity values calculated from an analysis of the first and second echoes, the virtual array matrix arranging the range and velocity values according to a virtual uniform rectangular antenna array, and estimating angle of arrival information associated with the object based on a fast Fourier transform analysis of the virtual array matrix.

Example 44 includes the method of example 43, further including generating a nonuniform mapping of the angle of arrival information.

Example 45 includes the method of example 44, wherein the nonuniform mapping corresponds to a polar grid.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus comprising:
   an antenna array controller to:
      cause transmission of a first signal via a first transmitter of a radar antenna array, the first signal having a first duration and modulated across a first frequency range from a first frequency to a second frequency;
      cause transmission of a second signal via a second transmitter of the radar antenna array, the second signal having a second duration and modulated across a second frequency range from a third frequency to the second frequency, the third frequency different than the first frequency; and
      cause transmission of a third signal via the first transmitter, the third signal having a third duration and modulated across a third frequency range from a fourth frequency to the first frequency, the first and third frequencies between the second and fourth frequencies, both the first and second signals to start at a same time, the third signal to start at an end of the first signal, a duration of the second signal to overlap with both the first and third signals; and
   a signal separation analyzer to:
      determine a first echo received at a receiver of the radar antenna array corresponds to the first signal, the first echo produced by the first signal reflecting off an object; and
      determine a second echo received at the receiver corresponds to the second signal, the second echo produced by the second signal reflecting off the object.

2. The apparatus of claim 1, further including a transmitter signal generator to generate the first and second signals to be modulated across the respective first and second frequency ranges at a same linear rate of change.

3. The apparatus of claim 1, wherein the radar antenna array includes a plurality of transmitters to transmit a plurality of signals, the plurality of transmitters including the first and second transmitters and the plurality of signals including the first and second signals, a waveform of the plurality of signals to enable a maximum unambiguous velocity detectable by the radar antenna array to remain substantially constant for different numbers of transmitters in the plurality of transmitters.

4. The apparatus of claim 1, further including a transmitter signal generator to define a time delay between initiation of the transmission of the first signal and initiation of the transmission of a fourth signal, the time delay being shorter than the first duration and shorter than the second duration.

5. The apparatus of claim 4, wherein the time delay corresponds to a duration of a chirp cycle divided by a total number of transmitters in the radar antenna array.

6. The apparatus of claim 1, wherein the first, second, and third signals are transmitted during a chirp cycle, the apparatus further including a transmitter signal generator to stitch first and second instances of the chirp cycle together in a baseband prior to processing the first, second, and third signals for transmission.

7. The apparatus of claim 1, wherein the first frequency is separated from the second frequency by a frequency offset value, the frequency offset value being smaller than the first frequency range and smaller than the second frequency range.

8. The apparatus of claim 7, wherein the frequency offset value corresponds to a fourth frequency range divided by a total number of transmitters in the radar antenna array, the fourth frequency range extending between the second and fourth frequencies.

9. The apparatus of claim 1, further including a transmitter signal generator to generate the first and second signals based on a window function.

10. The apparatus of claim 1, further including a phase code analyzer to:
generate the first signal by multiplying a first unscrambled signal by a first scrambling phase code;
generate the second signal by multiplying a second unscrambled signal by a second scrambling phase code;
apply a third scrambling phase code to the first echo, the third scrambling phase code is a conjugate of the first scrambling phase code; and
apply a fourth scrambling phase code to the second echo, the fourth scrambling phase code is a conjugate of the second scrambling phase code.

11. The apparatus of claim 1, further including:
a virtual array generator to generate a virtual array matrix based on range and velocity values calculated from an analysis of the first and second echoes, the virtual array matrix arranging the range and velocity values according to a virtual uniform rectangular antenna array, the virtual uniform rectangular antenna array different than a physical arrangement of the first and second transmitters in the radar antenna array;
an angle of arrival analyzer to estimate angle of arrival information associated with the object based on a fast Fourier transform analysis of the virtual array matrix; and
a visualization generator to generate a nonuniform mapping of the angle of arrival information to visually represent the angle of arrival information.

12. The apparatus of claim 11, wherein the angle of arrival information includes an elevation and azimuth of the object.

13. The apparatus of claim 11, wherein the nonuniform mapping corresponds to a polar grid.

14. The apparatus of claim 1, wherein the transmission of the first, second, and third signals correspond to first instances of the first, second, and third signals during a first instance of a chirp cycle, the antenna array controller to cause transmission of second instances of the first, second, and third signals during a second instance of the chirp cycle, the first instance of the third signal and the second instance of the first signal to define a first continuous signal transmitted via the first transmitter.

15. A non-transitory computer readable medium comprising instructions that, when executed, cause a machine to at least:
cause a first transmitter of a radar antenna array to transmit a first signal during a chirp cycle, the first signal to start at a first frequency and to be modulated across a first frequency range to a second frequency;
cause a second transmitter of the radar antenna array to transmit a second signal during the chirp cycle, the second signal to start at a third frequency and to be modulated across a second frequency range to the second frequency, the first frequency between the second and third frequencies, the first and second signals to start at a beginning of the chirp cycle, the second signal to extend beyond an end of the first signal;
cause the first transmitter to transmit a third signal during the chirp cycle, the third signal to start at a fourth frequency and to be modulated across a third frequency range to the first frequency, the third frequency between the first and fourth frequencies, the third signal to start at the end of the first signal, the third signal to extend beyond an end of the second signal;
cause the second transmitter to transmit a fourth signal during the chirp cycle, the fourth signal to start at the fourth frequency and to be modulated across a fourth frequency range to the third frequency;
stitch first and second instances of the chirp cycle together to generate a full circular chirp cycle prior to processing the first, second, third, and fourth signals for transmission, the full circular chirp cycle to be stored in memory, the transmission of the first, second, third, and fourth signals corresponding to transmission of the full circular chirp cycle;
determine a first echo received at a receiver of the radar antenna array corresponds to the first signal, the first echo produced by the first signal reflecting off an object; and
determine a second echo received at the receiver corresponds to the second signal, the second echo produced by the second signal reflecting off the object.

16. The non-transitory computer readable medium of claim 15, wherein the instructions further cause the machine to determine a characteristic of the object, the characteristic of the object corresponding to at least one of elevation, azimuth, range, or velocity.

17. The non-transitory computer readable medium of claim 15, wherein the radar antenna array includes a plurality of transmitters to transmit a plurality of signals, the plurality of transmitters including the first and second transmitters and the plurality of signals including the first and second signals, the instructions to cause the machine to define a waveform for the plurality of signals to enable a maximum unambiguous velocity detectable by the radar antenna array to remain substantially constant for different numbers of transmitters in the plurality of transmitters.

18. The non-transitory computer readable medium of claim 15, wherein the instructions further cause the machine to initiate the transmission of a fifth signal a time delay after initiation of the transmission of the first signal, the time delay being shorter than a first duration of the first signal and shorter than a second duration of the second signal.

19. The non-transitory computer readable medium of claim 15, wherein the first frequency is separated from the second frequency by a frequency offset value, the frequency offset value being smaller than the first frequency range and smaller than the second frequency range.

20. The non-transitory computer readable medium of claim 15, wherein the instructions cause the machine to:
generate the first signal by multiplying a first unscrambled signal by a first scrambling phase code before transmission of the first signal;
generate the second signal by multiplying a second unscrambled signal by a second scrambling phase code before transmission of the second signal;
apply a third scrambling phase code to the first echo, the third scrambling phase code being a conjugate of the first scrambling phase code; and
apply a fourth scrambling phase code to the second echo, the fourth scrambling phase code being a conjugate of the second scrambling phase code.

21. The non-transitory computer readable medium of claim 15, wherein the instructions cause the machine to stitch the first and second instances of the chirp cycle together in a baseband.

22. The non-transitory computer readable medium of claim 15, wherein the instructions cause the machine to:

generate a virtual array matrix based on range and velocity values calculated from an analysis of the first and second echoes, the virtual array matrix arranging the range and velocity values according to a virtual uniform rectangular antenna array, the virtual uniform rectangular antenna array different than a physical arrangement of the first and second transmitters in the radar antenna array; and estimate angle of arrival information associated with the object based on a fast Fourier transform analysis of the virtual array matrix.

23. A method of implementing a MIMO radar, the method comprising:

transmitting a first signal via a first transmitter of a radar antenna array during a first chirp cycle, the first signal having a first duration and modulated across a first frequency range;

transmitting a second signal via a second transmitter of the radar antenna array during the first chirp cycle, the second signal having a second duration and modulated across a second frequency range, the second duration of the second signal to extend beyond an end of the first signal, the first and second durations including an overlapping period of time, the first and second frequency ranges including an overlapping frequency range, transmission of the first and second signals initiated at a same time, the first signal to start at a first frequency and the second signal to start at a second frequency, the first frequency separated from the second frequency by a frequency offset value, the frequency offset value being smaller than the first frequency range and smaller than the second frequency range;

transmitting a third signal via the first transmitter during the first chirp cycle, transmission of the third signal to end at a time corresponding to an end of the first chirp cycle and to end at a final frequency corresponding to an initial frequency of the first signal;

transmitting a fourth signal via the first transmitter during a second chirp cycle, the fourth signal corresponding to a second instance of the first signal, a beginning of the second chirp cycle corresponding to the end of the first chirp cycle such that the third and fourth signals combine into a single continuous signal transmitted via the first transmitter, the continuous signal to extend through portions of both the first chirp cycle and the second chirp cycle;

stitching the first and second chirp cycles together in a baseband prior to processing the first, second, third, and fourth signals for transmission;

determining a first echo received at a receiver of the radar antenna array corresponds to the first signal, the first echo produced by the first signal reflecting off an object; and determining a second echo received at the receiver corresponds to the second signal, the second echo produced by the second signal reflecting off the object.

24. The method of claim 23, further including determining a characteristic of the object, the characteristic of the object corresponding to at least one of elevation, azimuth, range, or velocity.

25. The method of claim 23, wherein the radar antenna array includes a plurality of transmitters to transmit a plurality of signals, the plurality of transmitters including the first and second transmitters and the plurality of signals including the first and second signals, the method further including defining a waveform for the plurality of signals to enable a maximum unambiguous velocity detectable by the radar antenna array to remain substantially constant for different numbers of transmitters in the plurality of transmitters.

26. The method of claim 23, further including initiating the transmission of a fifth signal a time delay after initiation of the transmission of the first signal, the time delay being shorter than the first duration and shorter than the second duration.

27. The method of claim 23, further including generating the first and second signals based on a window function.

28. The method of claim 23, further including:

generating the first signal by multiplying a first unscrambled signal by a first scrambling phase code before transmission of the first signal;

generating the second signal by multiplying a second unscrambled signal by a second scrambling phase code before transmission of the second signal;

applying a third scrambling phase code to the first echo, the third scrambling phase code being a conjugate of the first scrambling phase code; and applying a fourth scrambling phase code to the second echo, the fourth scrambling phase code being a conjugate of the second scrambling phase code.

29. The method of claim 23, further including:

generating a virtual array matrix based on range and velocity values calculated from an analysis of the first and second echoes, the virtual array matrix arranging the range and velocity values according to a virtual uniform rectangular antenna array, the virtual uniform rectangular antenna array different than a physical arrangement of the first and second transmitters in the radar antenna array; and estimating angle of arrival information associated with the object based on a fast Fourier transform analysis of the virtual array matrix.

30. An apparatus comprising:

memory to store a chirp cycle in memory, the chirp cycle defining different signals to be transmitted by different transmitters in a radar antenna array;

machine readable instructions: and processor circuitry to execute the machine readable instructions to:

cause transmission of a first signal via a first transmitter of the radar antenna array based on transmission of a first instance of the chirp cycle, the first signal having a first duration and modulated across a first frequency range from a first frequency to a second frequency;

cause transmission of a second signal via a second transmitter of the radar antenna array based on transmission of the first instance of the chirp cycle, the second signal having a second duration and modulated across a second frequency range from a third frequency to the second frequency, the third frequency different than the first frequency;

cause transmission of a third signal via the first transmitter based on transmission of the first instance of the chirp cycle, the third signal having a third duration and modulated across a third frequency range from a fourth frequency to the first frequency, the first and third frequencies between the second and fourth frequencies;

cause transmission of a fourth signal via the second transmitter based on transmission of the first instance of the chirp cycle, the fourth signal having a fourth duration and modulated across a fourth frequency range from the fourth frequency to the third frequency, both the first and second signals to start at a same time but end at different times, the third signal to start at an end of the first signal, the fourth signal to start at an end of the second signal, both the third and fourth signals to end at a same time;

determine a first echo received at a receiver of the radar antenna array corresponds to the first signal, the first echo produced by the first signal reflecting off an object; and determine a second echo received at the receiver corresponds to the second signal, the second echo produced by the second signal reflecting off the object.

31. The apparatus of claim 30, wherein the processor circuitry is to generate the first and second signals based on a window function.

32. The apparatus of claim 30, wherein the processor circuitry is to stitch the first instance of the chirp cycle together with second instances of the chirp cycle to generate a full circular chirp cycle prior to processing the first, second, third, and fourth signals for transmission, the full circular chirp cycle to be stored in the memory.

* * * * *